United States Patent [19]

Kobayashi et al.

[11] 4,080,491
[45] Mar. 21, 1978

[54] PROCESS OF PRODUCING RING-OPENING POLYMERIZATION PRODUCTS

[75] Inventors: Yukio Kobayashi; Takashi Ueshima; Shoichi Kobayashi, all of Yokohama, Japan

[73] Assignee: Showa Denko K.K., Tokyo, Japan

[21] Appl. No.: 714,833

[22] Filed: Aug. 16, 1976

[30] Foreign Application Priority Data

| Aug. 27, 1975 | Japan | 50-103060 |
| Mar. 26, 1976 | Japan | 51-32464 |
| Mar. 26, 1976 | Japan | 51-32465 |
| Apr. 5, 1976 | Japan | 51-37274 |
| Apr. 27, 1976 | Japan | 51-47268 |
| May 25, 1976 | Japan | 51-59642 |

[51] Int. Cl.$^2$ .................................. C08F 4/78
[52] U.S. Cl. ........................ 526/137; 526/113; 526/127; 526/136; 526/169; 526/281; 526/308
[58] Field of Search ............ 526/96, 97, 98, 100, 526/102, 104, 105, 114, 169, 281, 136, 137, 113

[56] References Cited

U.S. PATENT DOCUMENTS

| 3,798,175 | 3/1974 | Streck | 526/136 |
| 3,856,758 | 12/1974 | Ueshima | 526/169 |
| 3,859,265 | 1/1975 | Hepworth | 526/281 |
| 3,959,234 | 5/1976 | Kurosawa | 526/281 |

Primary Examiner—Paul R. Michl
Attorney, Agent, or Firm—Fitzpatrick, Cella, Harper & Scinto

[57] ABSTRACT

A process of producing a ring-opening polymerization product of a norbornene derivative containing at least one polar group or aromatic group, a norbornadiene derivative containing at least one of said groups or a cycloolefin using a catalyst system prepared from an organometallic compound and the reaction product of tungsten oxide or molybdenum oxide and a phosphorus pentahalide or phosphorus oxytrihalide or these compounds and other third components. The catalyst system possesses a high polymerization activity.

37 Claims, No Drawings

PROCESS OF PRODUCING RING-OPENING POLYMERIZATION PRODUCTS

BACKGROUND OF THE INVENTION

The present invention relates to a process of producing ring-opening polymerization products and more particularly it relates to a process of producing a ring-opening polymerization product at a high polymerization activity by subjecting a norbornene derivative containing at least one polar group or aromatic group, a norbornadiene derivative containing at least one of said groups or a cycloolefin to a ring-opening polymerization in the presence of, if desired, an unsaturated polymer, using a catalyst system prepared from an organometallic compound and the reaction product of tungsten oxide or molybdenum oxide and a phosphorus pentahalide or phosphorus oxytrihalide or these compounds and other third components. It has been discovered that a novel and useful ring-opening polymerization product is obtained by polymerizing a norbornene derivative containing at least one cyano group, ester group, acid anhydride group, ether group, imide group, halogen atom or aromatic group, norbornadiene derivatives containing at least one of said groups, a cycloolefin or a mixture of at least one of the aforesaid derivatives using a catalyst system prepared from a tungsten compound or a molybdenum compound and an organometallic compound or these compounds and other third components such as, an organic peroxide, an acetalic compound, and an alcoholic compound as described in the specifications of our U.S. Pat. No. 3,856,758; Japanese Patent Application Laid Open Nos. 77,999/74; 58,200/75; 61,500/75; 71,800/75; 75,300/75; 103,600/75; 110,000/75 and 153,100/75.

Some of the ring-opening polymerization products obtained by the aforesaid processes are superior to polyvinyl chloride resin and polypropylene resin which have now been manufactured on an industrial scale and widely used in various industrial fields in not only the mechanical properties such as impact strength, low-temperature impact strength and tensile strength but also heat resistance and transparency. Furthermore, these polymerization products can be fabricated or molded into various forms by applying to a fabrication or molding method which has widely been employed in the field of thermoplastic resins, such as injection molding, extrusion molding, blow molding, compression molding and can be used for various purposes as containers, films, sheets, pipers and the like. Moreover, the properties of these polymerization products can be improved for fitting desired purposes by blending together with a thermoplastic resin such as a polyvinyl chloride riesin, a polymethyl-methacrylate resin, etc.; said thermoplastic resin also including an impact resistant resin such as an ABS resin and an ACS resin; a heat resistant resin such as a polyacetal resin, a polyamide resin, etc.; and/or a rubber-like material such as a polybutadiene rubber, a chlorinated polyethylene rubber, etc., or further by adding thereto various additives.

Still further, some other ring-opening polymerization products prepared by the aforesaid processes can be used, as is or following the polymer reaction, as ion-exchange resins, adhesives, and flocculants.

Also, it has been proposed to produce a ring-opening polymerization product by polymerizing a cycloolefinic compound such as cyclopentene using a catalyst system comprising tungsten oxide and/or molybdenum oxide and a Lewis acid such as aluminum chloride, titanium tetrachloride, tin tetrachloride, vanadium tetrachloride, etc., or these components and an organometallic compound of a metal belonging to Groups I to IV of the periodic table, in particular an organoaluminum compound as described in the specifications of Japanese Patent Application Laid Open Nos. 17,389/72; 39,388/72; and 39,599/73. The polymerization products obtained by these processes are suitable as rubber-like materials owing to their excellent elastic property.

Furthermore, it has been discovered that the same ring-opening polymerization products of the norbornene derivatives as mentioned above can be obtained by using the catalyst system described in the above-mentioned specifications (Japanese Patent Application No. 18470/74). However, even if a cycloolefin or norbornene derivative is polymerized in the presence of a catalyst system comprising tungsten trioxide and aluminum chloride or these compounds and an organoaluminum compound which is described as having the highest polymerization activity in the above-mentioned specifications, the polymerization activity is yet unsatisfactory.

Since the polar group present in the monomer as used in the present invention is known to inactivate the catalyst system thereby markedly decreasing the catalytic activity, attempts to obtain catalyst systems possessing excellent catalytic activity for the ring-opening polymerization of norbornene derivatives containing a polar group have not succeeded.

SUMMARY OF THE INVENTION

It is, therefore, a primary objective of the present invention to provide a process of producing ring-opening polymerization products of a norbornene derivative containing at least one polar group or aromatic group, a norbornadiene derivative containing at least one of said groups or a cycloolefin using a catalyst system possessing excellent catalytic activity.

Other objects, features and advantages will be apparent from the following detailed discussion.

The above and other objects are achieved in a process of producing a ring-opening polymerization product which comprises ring-opening polymerizing the norbornene derivative, norbornadiene derivative or cycloolefin in the presence of, if desired, an unsaturated polymer having a carbon-carbon double bond (the polymer is referred to hereafter as "unsaturated polymer") using the catalyst system prepared from an organometallic compound and the reaction product of at least one of tungsten oxide and molybdenum oxide and at least one of phosphorus pentahalide and phosphorus oxytrihalide, or these compounds and other third components.

That is, according to the present invention, there is provided a process of producing a ring-opening polymerization product which comprises ring-opening polymerizing in the presence or absence of an unsaturated polymer having a carbon-carbon double bond at least one of the norbornene derivatives each containing at least a polar group selected from the group consisting of a nitrile group, an ester group, an ether group, an amide group, a halogen atom, an acid anhydride group, an imide group and an aromatic nitrogen-containing heterocyclic group or an aromatic group, a norbornadiene derivative containing at least one said groups or a cycloolefin using the catalyst system prepared from (A) an organometallic compound of a metal belonging to Groups IA, IIA, IIB, IIIB, IVA, or IVB of the periodic table and (B) the reaction product of at least one of tungsten oxide and molybdenum oxide and at least one of phosphorus pentahalide and phosphorus oxytrihalide.

Since the catalyst system used in this invention possesses quite a high polymerization activity (or catalytic activity) and hence can give a high production yield of the ring-opening polymerization product per unit amount of catalyst or in other words, a small amount of the catalyst is sufficient for producing a definite amount of the ring-opening polymerization product, not only the amount of catalyst used can be reduced but also the production efficiency of the polymerization apparatus can be increased in the case of using the catalyst. In this case, furthermore, the amount of the catalyst present in the polymerization system is less since the amount of it required for the polymerization reaction may be less and thus after the polymerization is finished, the catalyst residue remaining in the ring-opening polymerization product thus obtained can be easily removed therefrom for preventing the occurrence of coloring and deterioration of the ring-opening polymerization product owing to the less amount of the catalyst residue in the product. Moreover, since the catalyst system of this invention shows less reduction in catalytic activity in the ring-opening polymerization or has a long catalytic life, the ring-opening polymerization can be carried out continuously for a long period of time.

DESCRIPTION OF THE PREFERRED EMBODIMENTS

Preferred norbornene derivatives containing at least one polar group or aromatic group include a norbornene derivative containing at least one nitrile group, a norbornene derivative containing at least one ester group, a norbornene derivative containing at least one ether group, a norbornene derivative containing at least one amide group, a norbornene derivative containing at least one halogen atom, a norbornene derivative containing at least one acid anhydride group, a norbornene derivative containing at least one imide group, a norbornene derivative containing at least one aromatic nitrogen-containing heterocyclic group, a norbornene derivative containing at least one aromatic group, a mixture of the aforesaid norbornene derivatives and a mixture of more than 50 mole percent of the aforesaid norbornene derivative and an unsaturated cyclic compound.

The norbornene derivative containing at least one nitrile group (referring at "cyano type norbornene derivative") contains at least one nitrile group or a hydrocarbon residue substituted by said nitrile group at the 5 and/or 6 positions of bicyclo[2,2,1]-heptene-2 as shown in the following general formula (I):

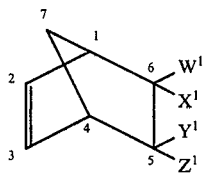

(I)

wherein $W^1$, $X^1$, $Y^1$ and $Z^1$, which may be the same or different, each represents a hydrogen atom, a nitrile group, or a hydrocarbon group selected from the group consisting of an alkyl group having at most 20 carbon atoms, a cycloalkyl group having at most 20 carbon atoms, an alkenyl group having at most 20 carbon atoms and an aryl group having at most 20 carbon atoms, said hydrocarbon group having or not having a nitrile group, at least one of $W^1$, $X^1$, $Y^1$ and $Z^1$ being, however, a nitrile group or the hydrocarbon residue substituted with a nitrile group.

Examples of the hydrocarbon groups represented by $W^1$, $X^1$, $Y^1$ and $Z^1$ of general formula (I) are methyl, ethyl, n-propyl, isobutyl, n-butyl, hexyl, octyl, dodecyl, tetradecyl, hexadecyl, eicosyl, phenyl, naphthyl, tolyl, cyclohexyl, 1-methylcyclohexyl and 2-octenyl.

Typical cyano type norbornene derivatives are 5-cyano-bicylo-[2,2,1]-heptene-2; 5,5-dicyano-bicylo[2,2,1]-heptene-2; 5,6-dicyano-bicyclo[2,2,1]-heptene-2; 5-cyano-5-methyl-bicyclo[2,2,1]-heptene-2; 5-cyano-6-methyl-bicyclo[2,2,1]-heptene-2; 5-cyano-5-ethyl-bicyclo[2,2,1]-heptene-2; 5-cyano-5-octyl-bicyclo[2,2,1]-heptene-2; 5-cyano-6-phenyl-bicyclo[2,2,1]-heptene-2; 5-cyano-5, 6-dimethyl-bicyclo[2,2,1]-heptene-2; 5-cyanomethyl-bicyclo[2,2,1]-heptene-2; 5-ω-cyanoheptyl-bicyclo[2,2,1]-heptene-2; 5-cyano-6-cyclohexyl-bicyclo-[2,2,1]-heptene-2, 5-ω-cyano-2-decenyl-bicyclo[2,2,1]-heptene-2, 5-cyano-bicyclo[2,2,1]-heptene-2; 5,5-dicyano-bicyclo[2,2,1]-heptene-2; 5,6-dicyano-bicyclo[2,2,1]-heptene-2; 5-cyano-5-methyl-bicyclo[2,2,1]-heptene-2; 5-cyano-5-methyl-bicyclo[2,2,1]-heptene-2 and 5-cyanomethyl-bicyclo[2,2,1]-heptene-2.

Furthermore, other examples of the cyano type norbornene derivatives used in this invention are described in the specification of, for example, U.S. Pat. No. 3,856,758.

The norbornene derivatives containing at least one ester group (referred to as "ester type norbornene derivative") are represented by general formula (II) and general formula (III)

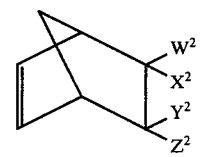

(II)

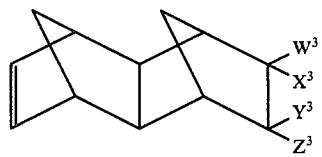

(III)

wherein $W^2$, $X^2$, $Y^2$ and $Z^2$ in general formula (II) and $W^3$, $X^3$, $Y^3$ and $Z^3$ in general formula (III), each represents a hydrogen atom, an ester group represented by the general formula —COOR$^1$ or —OCOR$^1$ (wherein R$^1$ represents a hydrocarbon group having at most 20 carbon atoms), a hydrocarbon residue substituted with an ester group, represented by the general formula —R$^2$COOR$^3$ or —R$^2$OCOR$^3$ (wherein R$^3$ represents a hydrocarbon group having at most 20 carbon atoms and R$^2$ represents a divalent hydrocarbon group having at most 20 carbon atoms), or a hydrocarbon group having at most 20 carbon atoms, at least one of said $W^2$, $X^2$, $Y^2$ and $Z^2$ or $W^3$, $X^3$, $Y^3$ and $Z^3$ being, however, the ester group or the hydrocarbon residue substituted with an ester group.

Also, other ester type norbornene derivatives are represented by general formula (IV) and general formula (V)

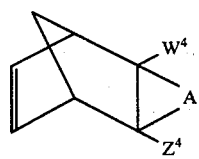

(IV)

and

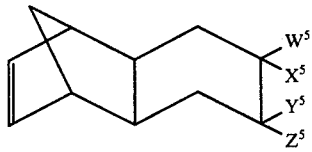

(V)

wherein A represents —COO—R⁴—OOC— or —COOR⁵— (where R⁴ and R⁵ each represents an alkylene group having at most 20 carbon atoms); W⁴ and Z⁴, being identical or different, each represents a hydrogen atom or a hydrocarbon group having at most 20 carbon atoms, and W⁵, X⁵, Y⁵ and Z⁵, which may be the same or different, each represents a hydrogen atom or the ester group the hydrocarbon group having at most 20 carbon atoms or the hydrocarbon residue substituted with an ester group as described above in connection with formulas (II) and (III), at least one of said W⁵, X⁵, Y⁵ and Z⁵ being, however, the ester group of the hydrocarbon residue substituted with the ester group.

In the practice of the process of this invention, the ester type norbornene derivatives represented by general formula (II) are most desirable among the ester type norbornene derivatives shown by above-indicated general formulae (II) to (V).

Practical examples of the desirable ester type norbornene derivatives of general formula (II) are 5-methoxycarbonyl-bicyclo[2,2,1]-heptene-2; 5-ethoxycarbonyl-bicyclo[2,2,1]-heptene-2; 5-butoxycarbonyl-bicyclo[2,2,1]-heptene-2; 5-allyloxycarbonyl-bicyclo[2,2,1]-heptene-2; 5-methyl-5-methoxycarbonyl-bicyclo[2,2,1]-heptene-2; 5-hexyloxycarbonyl-6-methyl-bicyclo[2,2,1]-heptene-2; 5-ethoxycarbonyl-6-phenyl-bicyclo[2,2,1]-heptene-2; 5-heptyl-6-octyloxycarbonyl-bicyclo[2,2,1]-heptene-2; 5-methoxycarbonyl-6-methoxycarbonyl-methyl-bicyclo[2,2,1]-heptene-2; 5,6-dimethoxycarbonyl-bicyclo[2,2,1]-heptene-2; 5,6-diethoxycarbonyl-bicyclo[2,2,1]-heptene-2; 5,5-dibutoxycarbonyl-bicyclo[2,2,1]-heptene-2; 5-methyl-6,6-dimethoxycarbonyl-bicyclo[2,2,1]-heptene-2; 5-ω-methoxycarbonylheptyl-6-octyl-bicyclo[2,2,1]-heptene-2; 5-ω-methoxycarbonyl-2-decenyl-6-pentyl-bicyclo[2,2,1]-heptene-2; 5-ω-methoxycarbonylheptyl-6-2-octenyl-bicyclo[2,2,1]-heptene-2; 5-acetoxymethyl-bicyclo[2,2,1]-heptene-2; 5-propoxymethyl-bicyclo[2,2,1]-heptene-2; and 5-stearoxymethyl-bicyclo[2,2,1]-heptene-2, with 5-methoxycarbonyl-bicyclo[2,2,1]-heptene-2; 5-ethoxycarbonyl-bicyclo-[2,2,1]-heptene-2; 5-butoxycarbonyl-bicyclo[2,2,1]-heptene-2; 5-allyloxycarbonyl-bicyclo[2,2,1]-heptene-2; 5-methyl-5-methoxycarbonyl-bicyclo[2,2,1]-heptene-2; 5-methoxycarbonyl-6-methoxycarbonylmethyl-bicyclo[2,2,1]-heptene-2; 5,6-dimethoxycarbonyl-bicyclo[2,2,1]-heptene-2; 5,6-diethoxycarbonyl-bicyclo[2,2,1]-heptene-2; 5,5-dibutoxycarbonyl-bicyclo[2,2,1]-heptene-2; 5-acetoxymethyl-bicyclo[2,2,1]-heptene-2; 5-propoxymethyl-bicyclo[2,2,1]-heptene-2 and 5-stearoxymethyl-bicyclo-[2,2,1]-heptene-2.

Similarly, practical examples will be easily found of the ester type norbornene derivatives shown by general formulae (III), (IV) and (V).

The norbornene derivatives containing at least one ether group (referred to as "ether type norbornene derivative") are represented by general formulae (VI), (VII) and (VIII)

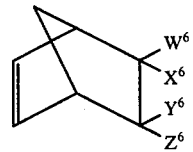

(VI)

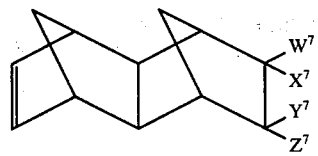

(VII)

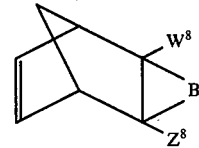

(VIII)

wherein W⁶, X⁶, Y⁶ and Z⁶ in general formula (VI) and W⁷, X⁷, Y⁷ and Z⁷ in general formula (VII), which may be the same or different, each represents a hydrogen atom, an ether group, or a hydrocarbon residue substituted with the ether group, represented by the general formula —R⁷OR⁶ (where R⁶ represents a hydrocarbon group having at most 20 carbon atoms and R⁷ represents a divalent hydrocarbon group having at most 20 carbon atoms) or a hydrocarbon group having at most 20 carbon atoms, at least one of said W⁶, X⁶, Y⁶ and Z⁶ or W⁷, X⁷, Y⁷ and Z⁷ being, however, an ether group or the hydrocarbon residue substituted with an ether group; and W⁸ and Z⁸ in general formula (VIII), which may be the same or different, each represents a hydrogen atom or a hydrocarbon group having at most 20 carbon atoms, and B represents —R⁸OR⁹— or —R¹⁰O— (where R⁸, R⁹, and R¹⁰ which may be the same or different, each represents a hydrocarbon group having at most 20 carbon atoms).

Practical examples of the ether type norbornene derivatives shown by general formula (VI) are 5-methoxy-bicyclo[2,2,1]-heptene-2; 5-n-propoxy-bicyclo-[2,2,1]-heptene-2; 5-isopropoxy-bicyclo[2,2,1]-heptene-2; 5-n-butoxy-bicyclo[2,2,1]-heptene-2; 5-octoxy-bicyclo-[2,2,1]-heptene-2; 5-cyclohexoxy-bicyclo[2,2,1]-heptene-2; 5-methoxymethyl-bicyclo[2,2,1]-heptene-]; 5-isobutoxymethyl-bicyclo[2,2,1]-heptene-2; 5-methoxy-6-methoxymethyl-bicyclo[2,2,1]-heptene-2 and 5-phenoxy-bicyclo[2,2,1]-heptene-2.

Similarly, practical examples will also be found about the ether type norbornene derivatives represented by general formulae (VII) and (VIII).

Also, the norbornene derivatives containing at least one amide group (referred to as "amide type norbornene derivative") are represented by general formulae (IX) and (X) indicated above

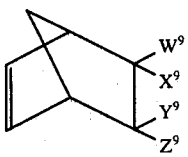  (IX)

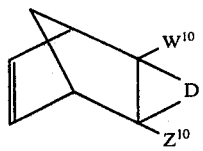  (X)

wherein $W^9$, $X^9$, $Y^9$ and $Z^9$ in general formula (IX), which may be the same or different, each represents a hydrogen atom, an amide group represented by the general formula

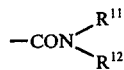

(where $R^{11}$ and $R^{12}$, which may be the same or different, each represents a hydrocarbon group having at most 20 carbon atoms), an amide group containing hydrocarbon residue represented by the formula

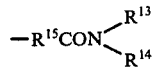

(where $R^{13}$ and $R^{14}$, which may be the same or different, each represents a hydrocarbon group having at most 20 carbon atoms and $R^{15}$ represents a hydrocarbon group having at most 20 carbon atoms), or the hydrocarbon group having at most 20 carbon atoms; at least one of said $W^9$, $X^9$, $Y^9$ and $Z^9$ being the amide group or the amide group-containing hydrocarbon residue; D in general formula (X) represents

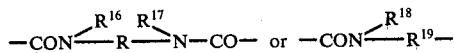

(where $R^{16}$, $R^{17}$, and $R^{18}$, which may be the same or different, each represents a hydrocarbon group having at most 20 carbon atoms and $R^{19}$ represents an alkylene group having at most 20 carbon atoms); and $W^{10}$ and $Z^{10}$ in general formula (X), which may be the same or different, each represents a hydrogen atom or a hydrocarbon group having at most 20 carbon atoms.

Furthermore, in the present invention, the amide type norbornene derivatives of the general formula (IX) indicated above wherein at least one of $W^9$, $X^9$, $Y^9$ and $Z^9$ is a group represented by the general formula

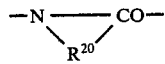

(where $R^{20}$ represents an alkylene group having at most 20 carbon atoms) may be used as the monomers.

Practical examples of the amide type norbornene derivatives are N,N-dimethyl-bicyclo[2,2,1]-heptene-2-carbonamide-5; N,N-dibutyl-bicyclo[2,2,1]-heptene-2-carbonamide-5; N-methyl-N-octyl-bicyclo[2,2,1]-heptene-2-carbonamide-5; N-methyl-N-cyclohexyl-bicyclo[2,2,1]-heptene-2-carbonamide-5; N-methyl-N-phenyl-bicyclo[2,2,1]-heptene-2-carbonamide-5; N,N-dicyclohexyl-bicyclo[2,2,1]-heptene-2-carbonamide-5; N,N-dibenzyl-bicyclo[2,2,1]-heptene-2-carbonamide-5; N,N,-dimethyl-5-methyl-bicyclo[2,2,1]heptene-2-carbonamide-5; N,N,-diethyl-6-methyl-bicyclo[2,2,1]-heptene-2-carbonamide-5; N,N-dimethyl-6-phenyl-bicyclo[2,2,1]-heptene-2-carbonamide-5; N,N,N',N'-tetramethyl-bicyclo-[2,2,1]-heptene-2-dicarbonamide-5,6 and N,N,N',N'-tetraethylbicyclo-[2,2,1]-heptene-2-dicarbonamide-5,6.

The norbornene derivatives containing at least one halogen atom (referred to as "halogen type norbornene derivative") are represented by general formulae (XI) and (XII),

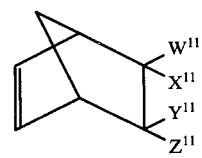  (XI)

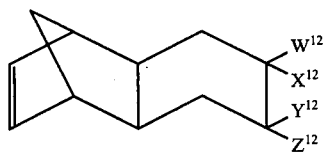  (XII)

wherin $W^{11}$, $X^{11}$, $Y^{11}$ and $Z^{11}$ in general formula (XI) and $W^{12}$, $X^{12}$, $Y^{12}$ and $Z^{12}$ in general formula (XII), which may be the same or different, each represents a hydrogen atom, a chlorine atom, a bromine atom, a hydrocarbon residue having at most 20 carbon atoms and having at least one chlorine atom or bromine atom, or a hydrocarbon group having at most 20 carbon atoms, at least one of said $W^{11}$, $X^{11}$, $Y^{11}$ and $Z^{11}$ or $W^{12}$, $X^{12}$, $Y^{12}$ and $Z^{12}$ being a chlorine atom, a bromine atom, or the hydrocarbon residue having a chlorine atom or a bromine atom.

Practical examples of the halogen type norbornene derivatives are 5-chloro-bicyclo[2,2,1]-heptene-2; 5-chloro-5-methyl-bicyclo[2,2,1]-heptene-2; 5-chloro-6-methyl-bicyclo[2,2,1]-heptene-2; 5-chloromethyl-bicyclo[2,2,1]-heptene-2; 5,5-dichloro-bicyclo[2,2,1]-heptene-2; 5,6-dichloro-bicyclo[2,2,1]-heptene-2; 5,5-bis-(chloromethyl)-bicyclo[2,2,1]-heptene-2; 5,6-bis-(chloromethyl)-bicyclo[2,2,1]-heptene-2; 5,5-dichloro-6-methyl-bicyclo[2,2,1]-heptene-2; --5-chloro-6-chloromethyl-bicyclo[2,2,1]-heptene-2; 5,6-dichloro-5-methyl-bicyclo[2,2,1]-heptene-2; 5-(α,β-dichloroethyl)-bicyclo[2,2.k]-heptene-2; 5-chloro-5-methyl-6-chloromethyl-bicyclo[2,2,1]-heptene-2; 5-chloromethyl-5-methyl-6-chloro-bicyclo[2,2,1]-heptene-2; 5,5,6-trichloro-bicyclo[2,2,1]-heptene-2; 5,5,6,6-tetrachloro-bicyclo[2,2,1]-heptene-2, and 5-bromomethyl-bicyclo[2,2,1]-heptene-2, with 5-chloro-bicyclo[2,2,1]-heptene-2; 5-chl-ro-5-methyl-bicyclo-[2,2,1]-heptene-2; 5-chloro-6-methyl-bicyclo[2,2,1]-heptene-2; 5-chloromethyl-bicyclo[2,2,1]-heptene-2, 5,5,-dichloro-bicyclo-[2,2,1]-heptene-2; 5,6-dichloro-bicyclo[2,2,1]-heptene-2; 5,5-bis(chloromethyl)-bicyclo[2,2,1]-heptene-2 and 5,6-bis-(chloromethyl)-bicyclo[2,2,1]-heptene-2.

Furthermore, the halogen type norbornene derivatives illustrated above as the practical examples in which at least one chlorine atom is replaced by a bromine atom can be also shown as other typical examples of them. Still other examples of the halogen type norbornene derivatives used as the monomers in this invention are described in the specification of Japanese Patent Application Nos. 125, 981/74.

The norbornene derivatives containing at least one acid anhydride group (referred to as "acid anhydride norbornene derivatives") are shown by general formulae (XIII) and (XIV)

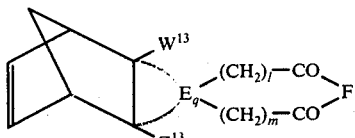

(XIII)

and

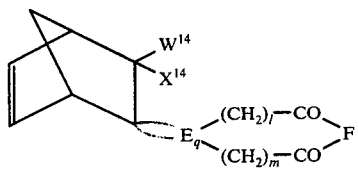

(XIV)

wherein $W^{13}$ and $Z^{13}$ or $W^{14}$ and $X^{14}$, which may be the same or different, each represents a hydrogen atom or a hydrocarbon group having at most 20 carbon atoms; E represents a tetravalent hydrocarbon group having 4 to 20 carbon atoms; F represents an oxygen atom; $l$ and $m$ each represents independently 1 or 2; and $q$ represents 0 or 1.

When $q$ is 0 in the aforesaid general formulae (XIII) and (XIV), the carbon atoms of the norbornene ring form a single ring together with the acid anhydride-containing group.

Practical examples of the acid anhydride type norbornene derivatives are 3,6-methylene-1,2,3,6-tetrahydro-cis-phthalic anhydride; 5-(5-carboxy-bicyclo[2,2,1]-hepta-2-enyl)acetic anhydride; 2-oxo-1,3-dioxo-5,8-methano-1,2,3,4,4a,5,8,8a-octahydronaphthalene; 5,8-methano-1,2,3,4,4a,5,8,8a-octahydronaphthalene-2,3-dicarboxylic anhydride; 1,4,5,8-dimethano-1,2,3,4,4a,5,8,8a-octahydronaphthalene-2,3-dicarboxylic anhydride; 2-oxa-1,3-dioxo-5,8,9,10-dimethano-1,2,3,4,4a,5,8,8a,9,9a,10,10a-dodecahydroanthracene; 3,6-methano-1-methyl-1,2,3,6-tetrahydro-cis-phthalic acid anhydride; 3,6-methano-1-butyl-1,2,3,6-tetrahydro-cis-phthalic anhydride; and 3,6-methano-1-octyl-1,2,3,6-tetrahydro-cis-phthalic anhydride, with 3,6-methylene-1,2,3,6-tetrahydro-cis-phthalic anhydride; 5,8-methano-1,2,3,4,4a,5,8,8a-octahydronaphthalene-2,3-dicarboxylic anhydride; 1,4,5,8-dimethano-1,2,3,4,4a,5,8,8a-octahydronaphthalene-2,3-dicarboxylic anhydride and 3,6-methano-1-methyl-1,2,3,6-tetrahydro-cis-phthalic acid anhydride.

Other examples of the acid anhydride type norbornene derivatives are described in the specification of Japanese Patent Application Laid Open No. 58,200/75.

The norbornene derivatives containing at least one imide group (referred as "imide type norbornene derivatives") are shown by general formulae (XV) and (XVI)

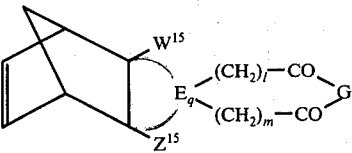

(XV)

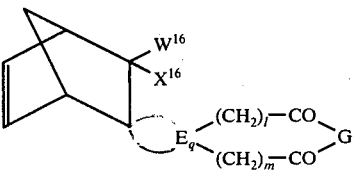

(XVI)

wherein, G represents a group having a general formula $>N - R^{21}$ (where $R^{21}$ represents a hydrocarbon group having at most 20 carbon atoms or a hydrocarbon residue having an ester group) $W^{15}$ and $Z^{15}$ have the same meaning as $W^{13}$ and $Z^{13}$, $W^{16}$ and $X^{16}$ have the same meaning as $W^{14}$ and $X^{14}$, and E, $l$, $m$, and $q$ have the same meaning as above.

Other examples of the imide type norbornene derivatives used in this invention are shown by the following general formula (XVII)

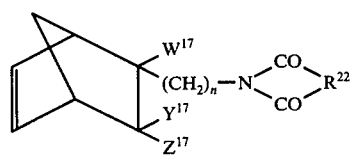

(XVII)

wherein $W^{17}$, $Y^{17}$ and $Z^{17}$, which may be the same or different, each represents a hydrogen atom or a hydrocarbon group having at most 20 carbon atoms; $R^{22}$ represents an alkylene group having 2-6 carbon atoms, an alkenylene group, or an arylene group; and $n$ represents 0, 1, or 2.

Practical examples of the imide type norbornene derivatives are N-methyl-3,6-methylene-1,2,3,6-tetrahydro-cis-phthalimide; N-ethyl-3,6-methylene-1,2,3,6-tetrahydro-cis-phthalimide; N-propyl-3,6-methylene-1,2,3,6-te-rahydro-cis-p-thalimide; N-n-butyl-3,6-methylene-1,2,3,6-tetrahydro-cis-phthalimide; N-octyl-3,6-methylene-1,2,3,6-tetrahydro-cis-phthalimide, N-cyclohexyl-3,6-methylene-1,2,3,6-tetrahydro-cis-phthalimide; N-phenyl-3,6-methylene-1,2,3,6-tetrahydro-cis-phthalimide; N-methoxy-carbonylmethyl-3,6-methylene-1,2,3,6-tetrahydro-cis-phthalimide; N-ethoxycarbonyl-3,6-methylene-1,2,3,6-tetrahydro-cis-phthalimide; N-butoxycarbonyl-3,6-methylene-1,2,3,6-tetrahydro-cis-1-methyl-1,2,3,6-tetrahydro-cis-phthalimide; N-butyl-3,6-methylene-1-butyl-1,2,3,6-tetrahydro-cis-phthalimide; bicyclo[2,2,1]-hepta-2-ene-5-spiro-3'-N-butyl succinimide; 2-butyl-2-aza-1,3-dioxo-5,8-methano-1,2,3,4,4a,5,8,8a-octahydronaphthalene; N-octyl-1,4,5,8-dimethano-1,2,3,4,4a,5,8,8a-octahydronaphthalene-2,3-dicarboxyimide; 5-maleimidomethyl-bicyclo-[2,2,1]-heptene-2,5-citraconimidomethyl-bicyclo[2,2,1]-heptene-2,5-glutaconimidomethyl-bicyclo[2,2,1]-heptene-2; 5-succinimidomethyl-bicyclo[2,2,12-heptene-2; and 5-phthalimidomethyl-bicyclo-[2,2,1]-heptene-2, with N-methyl-3,6-methylene-1,2,3,6-tetrahydro-cis-phthalimide; N-ethyl-3,6-methylene-1,2,3,6-tetrahydro-cis-phthalimide; N-propyl-3,6-methylene-1,2,3,6-tetrahydro-cis-phthalimide; N-n-butyl-3,6-methylene-1,2,3,6-tetrahydro-cis-phthalimide; N-octyl-3,6-methylene-1,2,3,6-tetrahydro-cis-phthalimide, N-cyclohexyl-3,6-methylene-1,2,3,6-tetrahydro-cis-phthalimide; N-phenyl-3,6-methylene-1,2,3,6-tetrahydro-cis-phthalimide; and N-octyl-1,4,5,8-dimethano-1,2,3,4,4a,5,8,8a-octahydronaphthalene-2,3-dicarboxyimide.

Furthermore, still other general formulae of the imide type norbornene derivatives, the production process of them, typical examples of the N-substituted-3,6-methylene-1,2,3,6-tetrahydro-cis-phthalimide compounds of the imide type norbornene derivatives, the N-(5-norborna-2-enyl) substituted maleimide compounds of them and typical examples of other imide type norbornene derivatives are described in the specification of Japanese Patent Application Laid Open No. 75,300/75.

The norbornene derivatives containing at least one aromatic nitrogen-containing heterocyclic group (referred to as "aromatic nitrogen-containing heterocyclic type norbornene derivatives") are the norbornene derivatives each containing a heterocyclic ring having at least one nitrogen atom in said ring (see, the item "Aromatic Character" of "Kagaku Dai Jiten (Chemical Encyclopedia)"; Vol. 8, page 601, 1969, published by Kyoritsu Publishing Co.).

The aromatic nitrogen-containing heterocyclic type norbornene derivatives are shown by general formulae (XVIII) and (XIX) indicated above,

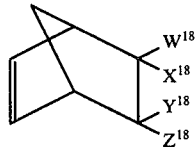

(XVIII)

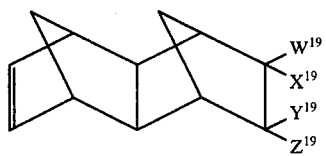

(XIX)

wherein, $W^{18}$, $X^{18}$, $Y^{18}$ and $Z^{18}$ in general formula (XVIII) or $W^{19}$, $X^{19}$, $Y^{19}$ and $Z^{19}$ in general formula (XIX), which may be the same or different, each represents a hydrogen atom; an alkyl group having at most 10 carbon atoms; an aromatic nitrogen-containing heterocyclic group selected from the group consisting of a pyridine group, a quinoline group, and a carbazole group; or the aromatic nitrogen-containing heterocyclic group substituted by an alkyl group having at most 20 carbon atoms, at least one of said $W^{18}$, $X^{18}$, $Y^{18}$ and $Z^{18}$ or $W^{19}$, $X^{19}$, $Y^{19}$ and $Z^{19}$ being said aromatic nitrogen-containing heterocyclic group or said alkyl-substituted aromatic nitrogen-containing heterocyclic group.

Practical examples of the aromatic nitrogen-containing heterocyclic type norbornene derivatives are 5-(2'-pyridyl)-bicyclo[2,2,1]-heptene-2; 5-(3'-pyridyl)-bicyclo[2,2,1]-heptene-2; 5-(4'-pyridyl)-bicyclo[2,2,1]-heptene-2; 5-(3'-methyl-2'-pyridyl)-bicyclo[2,2,1]-heptene-2; 5-(4'-methyl-2'-pyridyl)-bicyclo[2,2,1]-heptene-2; 5-(5'-methyl-2'-pyridyl)-bicyclo[2,2,1]--eptene-2; 5-(2'-ethyl-3'-pyridyl)-bicyclo[2,2,1]-heptene-2; 5-(3'-butyl-4'-pyridyl)-bicyclo[2,2,1]-heptene-2; 5-(2'-quinolyl)-bicyclo[2,2,1]-heptene-2; 5-(3'-quinolyl)-bicyclo[2,2,1]-heptene-2; 5-(4'-quinolyl)-bicyclo[2,2,1]-heptene-2; 5-(9'-carbazolyl)-bicyclo-[2,2,1]-heptene-2; 5-(3'-methyl-9-carbazolyl)-bicyclo[2,2,1]-heptene-2; 5-(3'-ethyl-9'-carbazolyl)-bicyclo[2,2,1]-heptene-2; 5-(3'-n-decyl-9'-carbazolyl)-bicyclo[2,2,1]-heptene-2; 5-(9'-methyl-3'-carbazolyl)-bicyclo[2,2,1]-heptene-2; 5-(9'-n-butyl-3'-carbazolyl)-bicyclo[2,2,1]-heptene-2; 5-(9'-n-octyl-3'-carbazolyl)-bicyclo[2,2,1]-heptene-2; and 2-(2'-pyridyl)-1,4; 5,8-dimethano-1,2,3,4,4a,5,8,8a-octahydronaphthalene.

Other typical examples of the aromatic nitrogen-containing heterocyclic type norbornene derivatives are described in the specification of Japanese Patent Application No. 15,310/'74.

The norbornene derivatives containing at least one aromatic group (referred as "aromatic type norbornene derivative") are represented by general formulae (XX) and (XXI),

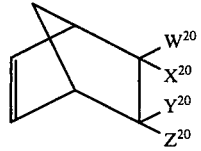

(XX)

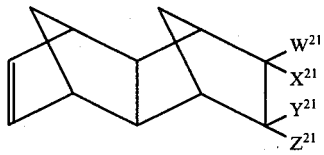

(XXI)

wherein, $W^{20}$, $X^{20}$, $Y^{20}$ and $Z^{20}$ or $W^{21}$, $X^{21}$, $Y^{21}$ and $Z^{21}$, which may be the same or different, each represents a hydrogen atom, an alkyl group having at most 20 carbon atoms, a cycloalkyl group having at most 20 carbon atoms, an alkenyl group having at most 20 carbon atoms or an aromatic hydrocarbon group substituted by a hydrocarbon group having at most 30 carbon atoms, said aromatic hydrocarbon group having at most 3 aromatic rings, and at least one of said $W^{20}$, $X^{20}$, $Y^{20}$ and $Z^{20}$ or $W^{21}$, $X^{21}$, $Y^{21}$ and $Z^{21}$ being said aromatic hydrocarbon group. Examples of the formulae of these aromatic hydrocarbon groups are clearly shown in the specification of Japanese Patent Application Nos. 61,851/74 together with the typical examples of the hydrocarbon groups as the substituents for the aromatic hydrocarbon groups.

Practical examples of the aromatic type norbornene derivatives are 5-phenyl-bicyclo[2,2,1]-heptene-2; 5-methyl-5-phenyl-bicyclo[2,2,1]-heptene-2; 5-ethyl-5-phenyl-bicyclo[2,2,1]-heptene-2; 5-n-butyl-6-phenyl-bicyclo[2,2,1]-heptene-2; 5-p-tolyl-bicyclo[2,2,1]-heptene-2; 5,6-diphenyl-bicyclo[2,2,1]-heptene-2; 5-α-naphthyl-bicyclo[2,2,1]-heptene-2; 5-anthryl-bicyclo[2,2,1]-heptene-2; 2-phenyl-1,4; 5,8-dimethano-1,2,3,4,4a,5,8,8a-octahydronaphthalene; 2-methyl-2-phenyl-1,4; 5,8-dimethano-1,2,3,4,4a,5,8,8a-octahydronaphthalene; 2-p-tolyl-1,4; 5,8-dimethano-1,2,3,4,4a,5,8,8a-octahydronaphthalene; and 2,3-diphenyl-1,4; 5,8-dimethano-1,2,3,4,4a,5,8,8a-octahydronaphthalene.

Other typical examples of the aromatic type norbornene derivatives are described in the specification of Japanese Patent Application Nos. 61,851/'74.

Preferred norbornadiene derivatives containing at least one polar group or aromatic group include a norbornadiene derivative containing at least one of the polar groups described in the above norbornene derivatives and a norbornadiene derivative containing at least one aromatic group.

The norbornadiene derivative containing at least one ester group (referred to as "ester type norbornadiene derivative") is the most preferable norbornadiene derivative containing at least one polar group.

The ester type norbornadiene derivatives are shown by following general formula (XXII)

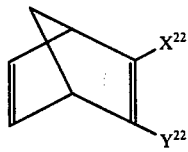

(XXII)

wherein $X^{22}$ and $Y^{22}$, which may be the same or different, each represents a hydrogen atom; a hydrocarbon group having at most 20 carbon atoms; or the ester-containing hydrocarbon residue represented by the general formula —$(CH_2)_mCOOR^{23}$ or —$(CH_2)_nOCOR^{24}$ (where $R^{23}$ and $R^{24}$ each represents a hydrocarbon group having at most 20 carbon atoms and m and n each represents 0 or an integer of 1–10), at least one of said $X^{22}$ and $Y^{22}$ being the ester-containing hydrocarbon residue.

Practical examples of the ester type norbornadiene derivatives are 2-methoxycarbonyl-bicyclo[2,2,1]-hepta-2,5-diene; 2-ethoxycarbonyl-bicyclo[2,2,1]-hepta-2,5-diene; 2-propyloxycarbonyl-bicyclo[2,2,1]-hepta-2,5-diene; 2-butyloxycarbonyl-bicyclo[2,2,1]-hepta-2,5-diene; 2-pentyloxycarbonyl-bicyclo[2,2,1]-hepta-2,5-diene; 2-hexyloxycarbonyl-bicyclo[2,2,1]-hepta-2,5-diene; 2-octyloxycarbonyl-bicyclo[2,2,1]-hepta-2,5-diene; 2-decyloxycarbonyl-bicyclo[2,2,1]-hepta-2,5-diene; 2-methoxycarbonyl-3-methyl-bicyclo[2,2,1]-hepta-2,5-diene; 2-methoxycarbonyl-3-ethylbicyclo[2,2,1]-hepta-2,5-diene; 2,3-dimethoxycarbonyl-bicyclo[2,2,1]-hepta-2,5-diene; 2,3-diethoxycarbonyl-bicyclo[2,2,1]-hepta-2,5-diene; 2,3-dipropyloxycarbonyl-bicyclo[2,2,1]-hepta-2,5-diene; 2,3-dibutyloxycarbonyl-bicyclo[2,2,1]-hepta-2,5-diene; 2,3-dipentyloxycarbonyl-bicyclo[2,2,1]-hepta-2,5-diene; 2,3-dihexyloxycarbonyl-bicyclo[2,2,1]-hepta-2,5-diene; 2-acetoxymethylbicyclo[2,2,1]-hepta-2,5-diene; 2-propionyloxymethyl-bicyclo[2,2,1]-hepta-2,5-diene; 2-butyryloxymethyl-bicyclo[2,2,1]-hepta-2,5-diene; 2-vareryloxymethyl-bicyclo[2,2,1]-hepta-2,5-diene; 2caprolyloxy-bicyclo[2,2,1]-hepta-2,5-diene; 2-capryloxymethyl-bicyclo[2,2,1]-hepta-2,5-diene; 2,3-di(acetoxymethyl)-bicyclo[2,2,1]-hepta-2,5-diene; 2,3-di(propionyloxymethyl)-bicyclo[2,2,1]-hepta-2,5-diene; 2,3-di(butyryloxymethyl)-bicyclo[2,2,1]-hepta-2,5-diene; 2-methoxycarbonylmethyl-bicyclo[2,2,1]-hepta-2,5-diene; 2-ethoxycarbonylmethyl-bicyclo [2,2,1]-hepta-2,5-diene; and 2-propyloxycarbonylmethyl-bicyclo[2,2,1]-hepta-2,5-diene.

The aromatic norbornadiene derivatives are the compounds in which the carbon atoms occupying the 5- and 6-positions of bicyclo[2,2,1]-heptene-2 concurrently constitute the two adjacent carbon atoms of an aromatic cyclic compound. The aromatic type norbornadiene derivatives are shown by the following general formulae (XXIII) and (XXIV),

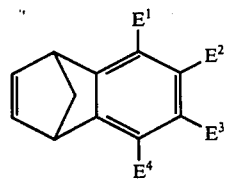

(XXIII)

and

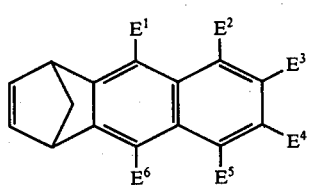

(XXIV)

wherein $E^1$, $E^2$, $E^3$, $E^4$, $E^5$ and $E^6$, which may be the same or different, each represents a hydrogen atom, a hydrocarbon group selected from the group consisting of an alkyl group having at most 10 carbon atoms, an alkenyl group having at most 10 carbon atoms, a cycloalkyl group having at least 10 carbon atoms, an aryl group having at most 10 carbon atoms, and an aralkyl group having at most 10 carbon atoms, a polar group selected from the group consisting of an ester group having at most 10 carbon atoms and an ether group having at most 10 carbon atoms, or the aforesaid hydrocarbon residue substituted with the polar group.

Practical examples of the aromatic norbornadiene derivatives are 1,4-dihydro-1,4-methano-naphthalene; 1,4-dihydro-1,4-methano-6-methylnaphthalene; 1,4-dihydro-1,4-methano-6-methoxycarbonylnaphthalene; 5,8-diacetoxy-1,4-dihydro-1,4-methanonaphthalene; 5,8-diacetoxy-6,7-dicyano-1,4-dihydro-1,4-methanonaphthalene; 5,8-diacetoxy-6,7-dimethyl-1,4-dihydro-6,7-dichloro-1,4-dihydro-1,4-methanonaphthalene; 1,4-dihydro-1,4-methanoanthracene and 9,10-diacetoxy-1,4-dihydro-1,4methananthracene.

Other typical examples of the aromatic type norbornadiene derivatives are described in the specification of Japanese Patent Application Laid Open No. 61,500/'75.

Preferred cycloolefins are generally classified into monocyclic monoolefinic compounds, nonconjugated cyclic polyene compounds, and polycyclic olefinic compounds.

The monocyclic monoolefinic compounds are shown by the following general formula (XXV)

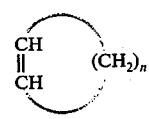

(XXV)

wherein n is an integer of 3 to 20.

Typical examples of the monocyclic monoolefinic compounds are cyclopentene, cycloheptene, cyclooctene, cyclodecene, cyclododecene, and those monocyclic monoolefinic compounds each substituted by at least one hydrocarbon group selected from the group consisting of an alkyl group having at most 10 carbon atoms, an alkenyl group having at most 10 carbon atoms, and an aryl group having at most 10 carbon atoms at the methylene carbon thereof.

Also, the nonconjugated cyclic polyene compounds are shown by the following general formula (XXVI) and (XXVII)

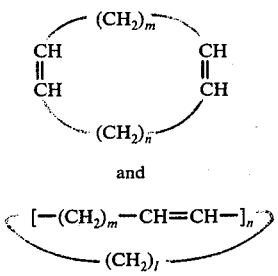

(XXVI)

and $$[-(CH_2)_m-CH=CH-]_n$$
$$(CH_2)_l$$

(XXVII)

wherein $l$ is an integer of 1–20 and $m$ and $n$ each is an integer of 2–20.

Typical examples of the nonconjugated cyclic polyene compounds are 1,5-cyclooctadiene and 1,5,9-cyclododecatriene. Furthermore the aforesaid nonconjugated cyclic polyene compounds substituted by at least one of the aforesaid hydrocarbon groups and/or a halogen atom may be used in this invention and typical examples of these compounds are 1-chloro-1,5-cyclooctadiene and 1-methyl-1,5-cyclooctadiene.

Moreover, other examples of the nonconjugated cyclic polyene compounds represented by aforesaid general formula (XXVII) are the oligomers (generally having a polymerization degree of at most 100) obtained by subjecting the cycloolefinic compounds represented by the aforesaid general formula (XXV) or (XXVI) to, for example, a metathesis polymerization.

Still further, the polycyclic olefinic compounds are the olefinic compounds each having 2–10 rings and 1–5 carbon-carbon double bonds.

Practical examples of the polylcyclic olefinic compounds are bicyclo[2,2,1]-heptene-2 (i.e., norbornene); 5-methyl-bicyclo[2,2,1]-heptene-2; 5-vinyl-bicyclo[2,2,1]-heptene-2; 5-ethylidene-bicyclo[2,2,1]-heptene-2; 5-isopropenyl-bicyclo[2,2,1]-heptene-2; dicyclopentadiene; bicyclo[2,2,1]-hepta-2,5-diene (i.e., norbornadiene); and 1,4,5,8-dimethano-1,2,3,4,4a,5,-8,8a-octahydronaphthalene.

The norbornene derivatives may each contain two or more polar groups which are different from each other and in such norbornene derivatives, at least two of the substituents $W^1$, $X^1$, $Y^1$ and $Z^1$ in the above general formulae are polar groups selected from the group consisting of cyano groups, ester groups, halogen atoms (chlorine atom and bromine atom), ether groups, imide groups, acid anhydride groups and amide groups or a hydrocarbon residue substituted with these polar groups and the at least two polar groups of the norbornene derivative differ from each other. For example, in general formula (I), if $W^1$ among $W^1$, $X^1$, $Y^1$ and $Z^1$ is a cyano group, one of $X^1$, $Y^1$ and $Z^1$ is a different polar group than the cyano group, such as an ester group, an ether group, and an amide group or a hydrocarbon residue substituted with such a different polar group.

In addition, there are two or more kinds of isomers, the endo type isomer, the exo type isomer and other according to the positions of the substituents in regard to the cyano type norbornene derivatives, the ester type norbornene derivatives, the amide type norbornene derivatives, the halogen type norbornene derivatives, the acid anhydride type norbornene derivatives, the aromatic type norbornene derivatives, the aromatic nitrogen-containing heterocyclic type norbornene derivatives, the norbornene derivatives having different polar groups, and some of the cycloolefinic compounds (e.g., 5-methyl-bicyclo[2,2,1]-heptene-2) among the above-described monomers. At the production of ring-opening polymerization products, these isomers may be separated before use by, for example, a rectifying method or a recrystallization method but they may be used without being separated or as a mixture of them.

The monomer of the type represented by general formula (I) may be generally prepared by subjecting a corresponding compound having one double bond (e.g., acrylonitrile, methyl methacrylate, vinyl acetate, vinyl chloride, vinylidene chloride, styrene, etc.,) and cyclopentadiene or dicyclopentadiene to a Diels-Alder reaction. Also, the monomer of the type represented by general formula (III) may be prepared similarly. In these reactions, the production yields for the monomers of the type shown by general formula (I) and general formula (III) depend upon the reaction conditions. Furthermore, the monomer of the type represented by general formula (III) is also obtained by subjecting the monomer of the type represented by general formula (I) and cyclopentadiene or dicyclopentadiene to a Diels-Alder reaction but in this case the monomer of the type shown by general formula (I) sometimes remains unreacted in the product. When the product is obtained as a mixture of the monomer of the type of formula (I) and the monomer of formula (III) in the aforesaid reactions, the monomers may be separated from each other, if desired, by a rectifying method or a recrystallization method. In the practice of this invention, however, the monomers may be used as is (i.e., without separation).

Furthermore, in general, as the content of the monomer of the type represented by general formula (II) increases, the ring-opening polymerization product having excellent heat resistance can be obtained but, on the other hand, the polymer obtained has not always sufficient workability or moldability.

Accordingly, in the case of carrying out the ring-opening polymerization of the cyano type norbornene derivative, the ester type norbornene derivative, the ether type norbornene derivative, the halogen type norbornene derivative, the amide type norbornene derivative, the aromatic norbornene derivative, or the aromatic nitrogen-containing heterocyclic type norbornene derivative indicated about, it is desirable to employ, respectively, the monomer represented by formulae (I), (II), (VI), (XI), (IX), (XX) or (XVIII) as the main component for the homopolymerization or copolymerization. Moreover, in the ring-opening polymerization of the imide type norbornene derivative, it is also preferred by the same reason as above to employ the monomer shown by formula (XV) as the main component for the homopolymerization or copolymerization.

Furthermore, in the case of using as the starting materials for producing ring-opening polymerization products of the cyano type norbornene derivatives, the ester type norbornene derivatives, the ether type norbornene derivatives, the halogen type norbornene derivatives, the imide type norbornene derivatives, the amide type norbornene derivatives, the aromatic type norbornene derivatives, or the aromatic nitrogen-containing heterocyclic norbornene derivatives among the aforesaid various monomers, the heat resistance of the polymerization products decreases as the number of carbon atoms of the monomers increases and hence it is preferable that the monomers used have less than 40, particularly less then 20 carbon atoms as the total carbon numbers (including the carbons of the norbornene ring and the polar group or groups). Also, in regard to the halogen type norbornene derivatives, the number of the halogen atoms in said each derivative is at most 10.

In the preferred aromatic type norbornene derivatives, the aromatic nucleus is phenyl or substituted phenyl. Furthermore, in the aromatic nitrogen-containing heterocyclic norbornene derivatives, it is desirable that the aromatic nitrogen-containing heterocyclic group be a pyridyl group or a nucleus-substituted pyridyl group having at most 10 carbon atoms.

Also, in regard to the acid anhydride norbornene derivatives, it is preferred that the total carbon number thereof be at most 40 as in the aforesaid cases and, in this case, it is more preferred that in the monomers shown by formula (XIII) or (XIV), $q$ is O and $l$ and $m$ are 0 or 1, and the total carbon number is less than 20. In the aromatic type norbornadiene derivatives, it is desirable that the total carbon number be at most 40, in particular less than 20. In particular, in general formula (XXIII) indicated above, it is preferred that $E^1$ and $E^4$ are a hydrogen atom or—$OCOR^{25}$(where, $R^{25}$ has at most 5 carbon atoms) and $E^2$ and $E^3$ are a hydrogen atom. Furthermore, in the ester type norbornadiene derivatives, it is preferred that the total carbon number be at most 40, particularly less than 30.

Therefore, in the case of ring-opening polymerizing at least one of the cyano type norbornene derivatives, the ester type norbornene derivatives, the ether type norbornene derivatives, the halogen type norbornene derivatives, and the amide type norbornene derivatives (other monomers than above may or may not be included in the ring-opening polymerization or copolymerization), it is preferred that the monomer represented by general formulae (I), (II), (VI), (XI) and (IX), respectively, be present in the polymerization system in an amount of at least 1 mole % in general, more particularly more than 10 mole %, and particularly more than 50 mole %. Furthermore, in the case of ring-opening polymerizing the imide type norbornene derivatives (other monomers than above may or may not be included in the ring-opening polymerization or copolymerization), it is preferred that the monomer of formula (XV) be present in the polymerization system in an amount of generally at least 1 mole %, more preferably more than 10 mole %, and particularly more than 50 mole %. Still further, in the case of ring-opening polymerizing the monomer represented by general formula (XXIII), it is preferred that the monomer be present in an amount of generally at least 1 mole %, more preferably more than 10 mole %, and particularly more than 50 mole %.

In the process of this invention, only one of these monomers may be subjected to the ring-opening polymerization or two or more kinds of the monomers may be subjected to the polymerization.

The organometallic compounds used for preparing the catalyst systems used in this invention are the organometallic compounds containing at least one of the metals belonging to Groups IA, IIA, IIB, IIIB, IVA, and IVB of the periodic table and some of these organometallic compounds are shown by the following formula $$M(R^{26})_n$$

wherein M represents the metal belonging to Group IA, IIA, IIB, IIB, IVA, or IVB of the periodic table; $R^{26}$ represents an organic group having at most 20 carbon atoms selected from an alkyl group, an alkenyl group, an aryl group, an aralkyl group, an alkoxide group, a phenoxy group, and a cyclopentadienyl group, a hydrogen atom, or a halogen atom, the groups represented by $R^{26}$ may be the same or different and at least one of said groups is a hydrogen atom or the organic group; $n$ represents the maximum atomic valence number of said metal or a positive integer of less than the maximum atomic valence number.

Other examples of the organometallic compounds used in this invention are the complexes of the aforesaid organometallic compounds and an equimolar amount of pyridine, triphenylphosphine, or diethyl ether; the reaction products of 1 mole of the aforesaid organometallic compounds and at most 2.0 moles of water; and the complex salts of two kinds of the aforesaid organometallic compounds.

Typical examples of the organometallic compounds used in this invention are the organometallic compounds of lithium, sodium, potassium, magnesium, calcium, zinc, boron, aluminum, gallium, titanium, zirconium, silicon, germanium, or tin. However, the organometallic compounds of lithium, sodium, magnesium, zinc, aluminum, or tin are preferable and further organoaluminum compounds are particularly preferable. Practical examples of the preferred organoaluminum compounds are triethylaluminum, triisobutylaluminum, trihexylaluminum, diethylaluminum chloride, di-n-butylaluminum chloride, ethylaluminum sesquichloride, diethylaluminum butoxide, and the reaction product of triethylaluminum and water at 1 : 0.5 by mole ratio. Other examples of the organoaluminum compounds used in this invention are described in the specifications of U.S. Pat. No. 3,856,758, and Japanese Patent Application Laid Open Nos. 77,999/'74; 58,200/'75; 61,500/'75; 71,800/'75 and 75,300/'75. Still other examples of the organoaluminum compounds are aluminum-siloxalane compounds, aluminumamide compounds, dialumoxane compounds, and the double salts containing these organoaluminum compounds.

The aforesaid aluminum-siloxalane compounds used as the organometallic compounds in this invention are represented by the following general formula (XXVIII)

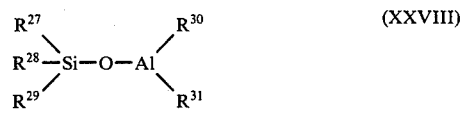

wherein $R^{27}$, $R^{28}$ and $R^{29}$, which may be the same or different, each represents a halogen atom, an alkyl group having at most 10 carbon atoms, or an alkoxy group having at most 10 carbon atoms; $R^{30}$ represents an alkyl group having at most 10 carbon atoms; and $R^{31}$ represents an alkyl group having at most 10 carbon atoms, an alkoxy group having at most 10 carbon atoms, or a substituent having the general formula (XXIX)

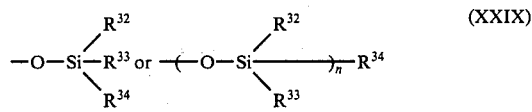

(where, $R^{32}$, $R^{30}$ and $R^{34}$, which may be the same or different, each has the same meaning as with $R^{27}$, $R^{28}$, and $R^{29}$ above and $n$ is a positive integer less than 10).

Practical examples of the aluminum-siloxalane compounds used in this invention are dimethylaluminum-trimethylsiloxalane, diethylaluminum-trimethylsiloxalane, di-n-propylaluminum-trimethylsiloxalane, diisobutylaluminum-trimethylsiloxalane, dioctylaluminum-trimethylsiloxalane, dimethylaluminum-trichlorosiloxalane, diethylaluminum-dimethylethylsiloxalane, dimethylaluminum-trimethoxysiloxalane, dimethylaluminum-triethylsiloxalane, dimethoxyaluminum-trimethylsiloxalane, dimethoxyaluminum-trimethylsiloxalane, and dichloroaluminum-trimethoxysiloxalane.

Also, the aluminum amide compounds used as the organometallic compounds in this invention are shown by the following general formula (XXX)

(XXX)

wherein $R^5$, $R^6$ and $R^7$ which may be the same or different, each represents a hydrogen atom or an alkyl group having at most 10 carbon atoms and $R^8$ represents a halogen atom or an alkyl group having a most 10 carbon atoms.

Practical examples of the aluminum amide compounds used in this invention are diethylaluminum dimethylamide, diethylaluminum diethylamide, dimethylaluminum dimethylamide, dimethylaluminum di-n-butylamide, diethylaluminum di-n-butylamide, dichloroaluminum dimethylbutylamide, dimethylaluminum dioctylamide, diisobutylaluminum di-n-butylamide, and dihexylalumium dioctylamide.

The dialumoxane compounds used as the organometallic compounds in this invention are shown by the following general formula (XXXI)

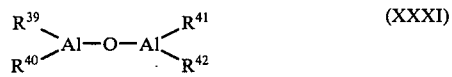

(XXXI)

wherein $R^9$, $R^{40}$ and $R^{41}$, which may be the same or different, each represents a halogen atom, an alkyl group having at most 10 carbon atoms, or an alkoxy group having at most 10 carbon atoms and $R^{42}$ represents an alkyl group having at most 10 carbon atoms.

Practical examples of the dialumoxane compounds used in this invention are tetramethyl dialumoxane, tetraethyl dialumoxane, tetraisobutyl dialumoxane, 1,1-dimethyl-3,3-diethyl dialumoxane, 1,1-dimethyl-3,3-diisobutyl dialumoxane, tetradecyl dialumoxane, trimethyl dialumoxane chloride, and triethyl dialumoxane chloride.

Furthermore, typical and practical examples of the organometallic compounds other than the organoaluminum compounds are n-butyllithium, phenyllithium, n-amylsodium, cyclopentadienylsodium, phenylpotassium, diethylmagnesium, ethylmagnesium chloride, methylmagnesium iodide, allylmagnesium chloride, n-propylmagnesium chloride, tert-butyl magnesium chloride, phenylmagnesium chloride, diphenylmagnesium, ethyl ethoxymagnesium, dimethylzinc, diethylzinc, diethoxyzinc, phenylcalcium iodide, dibutylboron chloride, diborane, trimethylboron, triethylsilane, silicon tetrahydride, triethyl silicon hydride, dimethylgallium chloride, titanium tetrahydride, titanium tetra-n-butoxide, dicyclopentadienytitanium dichloride, dicyclopentadienyl zirconium dichloride, tetramethyltin, tetraethyltin, trimethyltin chloride, dimethyltin dichloride, trimethyltin hydride, tetraethoxytin, tetrabutoxytin, a complex of ethylmagnesium- bromide and ethanol, and the reaction product of diethylzinc and water ($H_2O/Zn(C_2H_5)_2 < 2.0$ by mole ratio).

Other examples of the organometallic compounds used in this invention are the double salts of two kinds of the aforesaid organometallic compounds such as, for example, lithium aluminum tetrahydride, calcium tetraethylzinc, etc.

In the practice of this invention, the above-mentioned organometallic compounds may be used individually or as a mixture of two or more of these compounds.

The reaction product of the oxide and a phosphorus pentahalide or phosphorus oxytrihalide used for preparing the catalyst system in this invention can be prepared by reacting the oxide (i.e., tungsten oxide and/or molybdenum oxide) and a phosphorus pentahalide or phosphorus oxytrichloride in the presence or absence of an inert organic solvent.

Typical examples of the oxides used in the above reaction are tungsten trioxide, molybdenum trioxide, and tungsten or molybdenum oxyhalide such as, tungsten dioxydichloride, tungsten oxytetrachloride, and molybdenum oxytrichloride. Tungsten trioxide and molybdenum trioxide are particularly preferable.

Typical examples of phosphorus pentahalide and phosphorus oxytrihalide are phosphorus pentachloride, phosphorus pentafluoride, phosphorus pentabromide, phosphorus pentaiodide and phosphorus oxytrichloride. Phosphorus pentachloride is particularly preferable.

In the case of producing the reaction product, the ratio of the phosphorus compound to 1 mole of the oxide is generally 0.01 to 100 moles, preferably 0.05 to 50 moles, and most preferably 0.1 to 20 moles. If less than 0.01 mole or more than 100 moles of the phosphorus compound is reacted per mole of the oxide, a large amount of unreacted oxide or phosphorus compound remains in the reaction system, which does not contribute to increase the catalytic activity of the catalyst.

Also, the reaction temperature employed in the above reaction is generally 0° to 300° C, preferably 40° to 260° C, particularly 60° to 220° C. If the reaction temperature is lower than 0° C, the rate of reaction is low, while if the reaction temperature is higher than 300° C, it does not contribute to further increase the polymerization activity.

The reaction preferably is carried out in an inert organic solvent and the inert organic solvent means an organic solvent which does not cause a reaction with the aforesaid oxide and the phosphorous compound and is in a liquid state at the reaction temperature. It is preferred that the solvent have a melting point of lower than 30° C., more preferably lower than 20° C., and more particularly lower than 10° C. and a boiling point of lower than 500° C., more preferably lower than 400° C., and particularly lower than 300° C.

Examples of the inert organic solvents are aliphatic hydrocarbons such as pentane, hexane, heptane, octane, and decane; alicyclic hydrocarbons such as cyclopentane and cyclohexane; aromatic hydrocarbons such as benzene, toluene, and xylene; halogenated hydrocarbons such as methylene chloride, ethyl chloride, 1,1-dichloroethane, 1,2-dichloroethane, 1,2-dichloroethylene, 1-chloropropane, 2-chloropropane, 1-chlorobutane, 2-chlorobutane, 1-chloro-2-methylpropane, 1-chloropentane, chlorobenzene, o-dichlorobenzene, m- dichlorobenzene, and p-dichlorobenzene; and ethers such as diethyl ether and tetrahydrofuran.

At the production of the reaction product of the oxide and the phosphorus compound, the ratio of the inert organic solvents to the oxide employed depends upon the reaction conditions but is generally less than 50 parts by weight, preferably less than 29 parts by weight per one part by weight of the oxide. Even if more than 50 parts of inert organic solvents are used, it does not contribute to increase further the catalytic activity, which makes the use of such a large amount of the inert organic solvents meaningless.

In the above-mentioned reaction of producing the reaction product of the oxide and the phosphorus compound, the inert organic solvents described above may be used individually or as a mixture of them. Furthermore, the oxides and the phosphorus compounds described above each may be used individually or as a mixture of them respectively.

In a preferred embodiment of the aforesaid reaction, the reaction is carried out under the above-indicated reaction conditions such as the preferred reaction component ratio and reaction temperature and then the supernatant liquid formed is used as the catalyst component. When the reaction product of the oxide and the phosphorus compound prepared by such a method is used for preparing the catalyst system, the catalyst system shows quite high catalytic activity.

The period of time required for finishing the above-mentioned reaction depends upon the reaction temperature and the ratio of the phosphorus compound to the oxide in the reaction system but is generally from a few minutes to a few hours. The reaction is finished when the supernatant liquid becomes red-purple or dark red and by using the catalyst system prepared using the reaction product (in particular, the supernatant liquid) having the aforesaid color, the ring-opening polymerization can be practiced at a high polymerization activity.

In addition, when a supernatant or a filtrate recovered from a solution containing the reaction product of the oxide and the phosphorus compound prepared by the aforesaid method is used, a homogeneous catalyst system is obtained but the aforesaid solution of the reaction product together with insoluble matters can be also used effectively for preparing the catalyst system without causing any troubles.

In the catalyst system prepared from the aforesaid reaction product of the oxide and phosphorus compound and the aforesaid organometallic compound, it is preferred that the ratio of the organometallic compound to 1 atom equivalent of tungsten and/or molybdenum contained in the reaction product is 0.1 - 100 moles, more preferably 0.3 - 40 moles, and particularly 0.5 - 20 moles. If the proportion of the organometallic compound is less than 0.1 mole per 1 atom equivalent of tungsten and/or molybdenum in the reaction product, the catalyst system prepared does not show sufficient catalytic activity, while if the proportion of the organometallic compound is higher than 100 moles, no further improvement of the catalytic activity is obtained.

In the practice of this invention, the catalytic system obtained from the above-mentioned organometallic compound and the reaction product of the oxide and the phosphorus compound can be effectively used but the catalyst system used in this invention may further contain a third component or third components.

Examples of such third components are water, oxygen, oxygencontaining organic compounds, nitrogen-containing organic compounds, halogen-containing organic compounds, phosphoruscontaining organic compounds, sulfur-containing organic compounds, metal salts of a carboxylic acid, metal hydroxides, metal oxides, metal halides, metal chelate compounds, metal alkoxides and phenoxides, metal salts and reactive group-containing polymers.

The oxygen-containing organic compounds have less than 30 carbon atoms, preferably 20 or less than 20 carbon atoms. Typical examples of these oxygen-containing organic compounds are peroxides such as an alkyl peroxide (e.g., tert-butyl peroxide), an aryl peroxide (e.g., benzoyl peroxide), an alkyl hydroperoxide (e.g., tert-butyl hydroperoxide), an aralkyl hydroperoxide (e.g., cumene hydroperoxide), a peracid (e.g., peracetic acid), and the esters, ketones, and aldehydes of them; epoxide compounds such as ethylene oxide, butene-1-oxide, epichlorohydrin, allylglycidyl ether, and butadiene monooxide; acetal compounds such as acetaldehyde diethyl acetal, 1,1-diethoxydiethane, and dichloroacetaldehyde dimethyl acetal; orthocarboxylic acid esters such as orthoformic acid alkyl ester (e.g., orthoformic acid methyl ester); alcohol compounds such as a monohydric alcohol (e.g., methanol, ethanol, n-butyl alcohol, and isobutyl alcohol), a phenolic compound (e.g., phenol), and polyhydric alcohol (e.g., ethylene glycol, propylene glycol, tetramethylene glycol, glycerine, xylylene glycol, and 1,4-cyclohexane diol); carboxylic acids such as an aliphatic monohydric carboxylic acid having at most 20 carbon atoms (e.g., formic acid, acetic acid, propionic acid, butyric acid, and capric acid), an aromatic or alicyclic monohydric carboxylic acid (e.g., benzoic acid and cyclohexane carboxylic acid) and a polyhydric carboxylic acid having at most 20 carbon atoms (e.g., succinic acid, fumaric acid, maleic acid, glutaric acid, sebacic acid, and 1,4-cyclohexanedicarboxylic acid); carboxylic acid anhydrides such as the anhydride of an aromatic or aliphatic monohydric carboxylic acid having at most 20 carbon atoms (e.g., acetic anhydride, propionic anhydride, butyric anhydride, and benzoic anhydride) and the anhydride of a cyclic acid (e.g., maleic anhydride, citraconic anhydride, bicyclo[2,2,1]-hepta-2-ene-5,6-dicarboxylic anhydride, and hexahydrophthalic anhydride); carboxylic acid ester compounds such as a carboxylic acid ester of a mono to trihydric carboxylic acid having at most 20 carbon atoms and a monohydric alcohol or phenol having at most 20 carbon atoms (e.g., ethyl formate, methyl acetate, methyl caproate, ethyl benzoate, dimethyl succinate, ethyl glutarate, ethyl cebacate, and dimethyl terephthalate), a cyclic ester (e.g., γ-butyrolactone and ε-caprolactone), and carboxylic acid ester compounds such as a carboxylic acid ester of a mono to trihydric hydroxy compound having at most 20 carbon atoms (e.g., an ester of an alcohol or phenol) and a monohydric carboxylic acid; carbonate compounds such as a carbonate of a monohydric hydroxy compound (e.g., diethyl carbonate, di-n-propyl carbonate, and diphenyl carbonate) and a tetraalkyl orthocarbonate (eg., tetramethyl orthocarbonate and tetra-n-butyl orthocarbonate); ketone compounds such as acetone, methyl ethyl ketone, and cyclopentanone; and ether compounds such as diethyl ether, di-n-butyl ether, anisole, and diphenyl ether.

The nitrogen-containing organic compounds have less than 40 carbon atoms, preferably 30 or less than 30 carbon atoms, and most preferably 20 or less than 20 carbon atoms. As such nitrogen containing organic compounds, there are illustrated amine compounds, nitrogen-containing heterocyclic compounds, acid amide compounds, compounds having a nitrogen-oxygen bond, and compounds having a nitrogen-halogen bond.

Examples of the amine compounds are primary amines such as methylamine, ethylamine, isopropylamine, n-butylamine, cyclohexylamine, benzylamine, aniline, and naphthylamine; secondary amines such as dimethylamine, methylethylamine, N-methylcyclohexylamine, N-methylbenzylamine, N-methylaniline, pyrrolidine, diethylamine, dicyclohexylamine, dibenzylamine, and di-n-propylamine; tertiary amines such as triethylamine, tri-n-butyamine, methyl-di-n-butylamine, N,N-dimethylcyclohexylamine, N,N-dimethylbenzylamine, N,N-dimethylaniline, and N-ethylpyrrolidine; diamines such as ethylenediamine, trimethylenediamine, hexamethylenediamine, 1,4-cyclohexanediamine, p-phenylenediamine, N,N-dimethylenediamine, N,N-dimethylhexamethylenediamine, piperazine, N,N,N',N'-tetramethylethylenediamine, and N,N,N'-N'-tetramethyl-p-phenylenediamine; and the N-hydrocarbon substitution derivatives of them.

Examples of the nitrogen-containing heterocyclic compounds are pyridine and the alkyl-substituted derivatives of it such as α-, β-, or γ-picoline, 2,3-lutidine-2,4-lutidine, 2,5-lutidine, 2,6-lutidine, 3,4-lutidine, 2,5-lutidine, 2,3,6-collidine and 2,4,6-collidine and quinoline and the alkyl-substituted derivatives of it such as 2-methylquinone, 4-methylquionline, 6-methylquinoline, 7-methylquinoline, 8-methylquinoline, isoquinoline, and 1-methyl isoquinoline.

The acid amide compounds are carboxylic acid amide compounds of monohydric or polyhydric carboxylic acids and ammonia or a primary or secondary amine such as acetamide, propionamide, hexaneamide, cyclohexane carbonamide, benzamide, N-methylacetamide, N-methylbenzacetoanilide, N,N-dimethyl formamide, N-methylacetanilide, succinamide, adiamide, and maleinamide; cyclic amide compounds such as -butyrolactam and -caprolactam; urea and derivatives of it such as 1,1-dimethylurea, 1,3-dimethylurea, 1,3-di-n-butylthiourea, and tetramethylurea; sulfonamides such as benzensulfonamide and p-toluenesulfonamide; and hexamethylphosphorus triamide.

Examples of the compounds having a nitrogen-oxygen bond are N-nitroso compounds and o-nitroso compounds such as N-nitrosodimethylamine, N-nitroso-N-methylphenylamine, N-nitrosodiphenylamine, n-amylnitrite, and isoamyl nitrite and aliphatic nitro compounds and aromatic nitro compounds (nitroaryl) having 1–3 nitro groups and 0 – 4 chlorine atoms such as nitroethane, 4-chloro-1-nitrotoluene, dinitrophenol, 4-chloro-2-nitroanisole, 1,3-dinitrobenzene, amyl nitrate and 1,2-dinitro-3,5-dichlorobenzene.

Furthermore, examples of the compounds having a nitrogenhalogen bond are trichloromelamine, N-chlorosuccinimide, N-bromosuccinimide, N-chlorophthalimide, and N-bromophthalimide.

The halogen-containing organic compounds have less than 20 carbon atoms and examples of the halogen-containing organic compounds are aliphatic hydrocarbons having one or two or more carbon-carbon double bonds, at least one carbon of said double bond having been substituted by a halogen atom, such as vinyl chloride; vinylidene chloride, trichloroethylene, tetrachloroethylene, chloroprene, and hexachloro-cyclopentadiene; halogenated aromatic hydrocarbons such as chlorobenzene, bromobenzene, and dichlorobenzene; tertiary hypohalide compounds; allylhalide compounds such as allyl chloride; tertiary alkylhalide compounds such as tert-butyl chloride; halogenated ketone compounds such as α-chloroacetone; and halogenated alcohol compounds such as 2-chloroethanol.

The phosphorus-containing organic compounds have less than 30 carbon atoms and examples of them are phosphine compounds such as tri-n-butylphosphine and triphenylphosphine; phosphine oxide compounds such as tri-n-butylphosphine oxide and triphenylphosphine oxide; phosphite compounds such as trimethyl phosphite, triethyl phosphite, and triphenyl phosphite; phosphate compounds sush as trimethyl phosphate, tri-n-butyl phosphate, and triphenyl phosphate; compounds having phosphorus-chlorine bond such as dichlorophenyl and chlorodiphenyl phosphines; and halogen-containing phosphate compounds represented by the formula

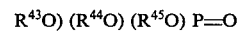

$R^{43}O)(R^{44}O)(R^{45}O)P=O$ wherein $R^{43}$, $R^{44}$ and $R^{45}$, which may be the same or different, each represents a hydrocarbon group having at most 20 carbon atoms, at least one of said $R^{43}$, $R^{44}$ and $R^{45}$ being a hydrocarbon residue substituted with at least one halogen atom.

Typical examples of the halogen-containing phosphate compounds are selected from the group consisting of tris (β-chloro-ethyl) phosphate, tris (β-bromo-ethyl) phosphate, tris (2,3-dichloro-n-propyl) phosphate, tris (2,3-dibromo-n-propyl) phosphate, tris (2-bromo-3-chloro-n-propyl) phosphate, tris (3-chloro-n-propyl) phosphate, tris(dichloro-isopropyl)phosphate and tris (2,4-dichloro-phenyl)phosphate.

Sulfur-containing organic compounds have less than 20 carbon atoms and examples of them are sulfide compounds such as diethyl sulfide, di-n-butyl sulfide, methylphenyl sulfide, diphenyl sulfide, and thiophene; sulfoxide compounds such as dimethyl sulfoxide, tetramethylene sulfoxide, and di-n-butyl sulfoxide; sulfone compounds such as dimethylsulfone, di-n-propylsulfone, tetramethylenesulfone, and diphenylsulfone; and compounds having a sulfur-halogen bond such as phenylsulfenyl chloride chloride and 2,4 -dinitrophenylsulfenyl chloride.

The metal salts of a carboxylic acid have at most 30 carbon atoms and examples of these compounds are the metal salts of a saturated monohydric carboxylic acid having 2 – 30 carbon atoms, such as propionic acid, 2-ethylhexanoic acid, palmitic acid, heptadecanoic acid, and nonadecanoic acid and a metal such as lithium, sodium, magnesium, calcium, barium, aluminum, lead, cobalt, and nickel; the metal salts of a saturated carboxylic acid containing a cycloalkyl group having 6 – 30 carbon atoms or a substituted cycloalkyl group and the aforesaid metals; and the metal salts of a carboxylic acid containing a phenyl or a substituted phenyl group and the aforesaid metals.

The metal oxides are the oxides of the metals belonging to Groups IA, IB, IIA, IIB, IIIA, IIIB, IVA. IVB, VA, VB, VIA, VIB, VIIA and VIIIA of the periodic table and also include the double oxides containing two or more of the aforesaid metals and the peroxides of the aforesaid metals.

Examples of the metal oxides are lithium oxide, sodium oxide, potassium oxide, rubidium oxide ($Rb_2O$, $RbO_2$, $RbO$), cesium oxide ($Cs_2O$, $CsO_2$, $Cs_2O_3$), copper oxide ($CuO$, $Cu_2O$), silver oxide, beryllium oxide, magnesium oxide, calcium oxide, strontium oxide, barium oxide ($BaO$, $BaO_2$), zinc oxide, cadmium oxide ($CdO$, $CdO_2$), mercury oxide ($HgO$, $Hg_2O$), scandium oxide, cerium oxide ($Ce_2O_3$, $CeO_2$, $CeO$), boron oxide ($BO$, $B_2O_3$), aluminum oxide, gallium oxide ($Ga_2O$, $Ga_2O_3$), indium oxide ($In_2O$, $InO$, $In_2O_3$), titanium oxide ($Ti_2O_3$, $TiO_2$), zirconium oxide, hafnium oxide, silicon oxide, germanium oxide ($GeO$, $GeO_2$), tin oxide ($SnO$, $SnO_2$), lead oxide ($PbO$, $Pb_3O_4$, $Pb_2O_3$, $PbO_2$), vanadium oxide ($V_2O_2$, $V_2O_3$, $V_2O_4$, $V_2O_5$), niobium oxide, tantalum oxide, antimony oxide ($Sb_2O_3$, $Sb_2O_4$, $Sb_2O_5$), bismuth oxide ($Bi_2O_3$, $Bi_2O_5$), chromium oxide ($CrO$, $Cr_2O_3$, $CrO_3$), molybdenum oxide ($MoO_2$, $MoO_3$), tungsten oxide ($WO_2$, $WO_3$), selenium oxide, tellurium oxide ($TeO_2$, $TeO_3$), manganese oxide ($MnO$, $Mn_3O_4$, $MnO_2$, $MnO_3$, $Mn_2O_7$), rhenium oxide ($ReO_2$, $Re_2O_7$), iron oxide ($FeO$, $Fe_3O_4$, $Fe_2O_3$), cobalt oxide ($CoO$, $Co_3O_4$, $Co_2O_3$), nickel oxide ($NiO$, $Ni_3O_4$, $Ni_2O_3$), ruthenium oxide ($Ru_2O_3$, $RuO_2$, $RuO_4$), rhodium oxide ($Rh_2O_3$, $RhO_2$), osmium oxide ($OsO_2$, $OsO_4$), iridium oxide and platinum oxide ($PtO$, $PtO_2$). Further, as the double oxides there are exemplied titaniferous iron ore ($FeTiO_3$), $CaTiO_3$, $SiO_2$-$Al_2O_3$ and $SiO_2$-$Cr_2O_3$.

The metal oxide may be used alone or as a mixture of two or more thereof. The metal oxides may contain water of crystallization and in a certain case the catalyst system prepared from the metal oxide containing the water of crystalization possesses a higher polymerization activity.

The metal hydroxides are the hydroxides of the metals belonging to Groups IA, IV, IIA, IIB, IIIB, IVA, IVB, VB, VIIA and VIII of the periodic table and also include the double salts of the metal hydroxides and the carbonate of aforesaid metals.

Examples of the metal hydroxides are lithium hydroxide, sodium hydroxide, potassium hydroxide, magnesium hydroxide, calcium hydroxide, strontium hydroxide, barium hydroxide, zinc hydroxide, cupric hydroxide, aluminum hydroxide, titanium hydroxide, stannic hydroxide, lead (IV) hydroxide, bismuth hydroxide, manganese, hydroxide, ferrous hydroxide, ferric hydroxide, nickel (I) hydroxide, nickel (II) hydroxide, cobalt (II) hydroxide and cobalt (III) hydroxide. The double salts of the hydroxide are basic lead carbonate [$PbCO_3 \cdot Pb(OH)_2$], basic copper carbonate [$CuCO_3 \cdot Cu(OH)_2$], basic magnesium carbonate [$(Mg_4(OH)_2 \cdot (CO_3)_3$]and basic cobalt carbonate [$Co_5(OH)_6 \cdot (CO_3)_2$]. The metal hydroxide may be used alone or as a mixture of two or more thereof.

The metal halides are the halides, oxyhalides and hydroxyhlides of the metals belonging to the Groups IA, IB, IIA, IIB, IIIA, IIIB, IVA, IVB, VA, VB, VIA, VIB, VIIA, and VIII of the periodic table.

Examples of the chlorides among the metal halides are LiCl, NaCl, KCl, $CuCl_2$, $BeCl_2$, $MgCl_2$, $CaCl_2$, $SrCl_2$, $BaCl_2$, $ZnCl_2$, HgCl, $HgCl_2$, $BCl_3$, $AlCl_3$, $TiCl_3$, $TiCl_4$, $ZrCl_4$, $SiCl_4$, $SnCl_2$, $SnCl_4$, $PbCl_2$, $VCl_3$, $SbCl_3$, $SbCl_5$, $MnCl_2$, $FeCl_2$, $FeCl_3$, $CoCl_2$ and $NiCl_2$. Also, the fluorides, bromides and iodides in which a chlorine atom in the aforesaid chlorides is replaced by a fluorine, bromine or iodine are other typical examples.

Furthermore, the metal oxyhalide is $VOCl_3$. The metal hydroxyhalide is magnesium hydroxychloride. Besides, the double salts of these metal halides, metal oxyhalides and hydroxyhalides may be used in this invention.

There are anhydride and an hydrate among the metal halides but each of them may be used. However, it is desirable to use the anhydride because of its high polymerization activity.

The metal chelate compounds are the chelate compounds of the metals belonging to Groups IA, IB, IIA, IIB, III, IVA, IVB, VA, VB, VIA, VIIA, and VIII of the periodic table. The typical examples of the metal chelate compounds are the chelate compounds of the aforesaid metals and dibasic carboxylic acid, natural aminoacid, aminoacid (not present in nature), oxyacid, polyphosphoric acid, nitrocarboxylic acid, other acids, salts thereof, aliphatic amine, aromatic amine, peptide, salicyclic aldehyde, derivatives thereof, other oxyaldehyde, $\beta$-diketone, phenol derivatives and o, o'-dioxyazo dyestuff and the like, and also they are described in the "Metal Chelate Compound" by E.M. artel M. Calvin.

The typical examples are the chelate compounds which include acetylacetone, salts thereof, ethylenediamine, polyphosphoric acid, ethylenediamine tetraacetic acid, salts thereof, dipyridyl, triethylenetetramine, citric acid, its salts, salicylic aldehyde, 8-oxyquinoline, pyrophosphoric acid, its salts, nitroaceticacid, cysteine, ammonium tri-acetic acid, 4,4'-diaminodiphenyl ether, o-diaminobenzene, 2,4:dihydroxybenzoic acid, o-nitrophenol and Eriochrome Black-T as a ligand.

The metal alkoxides and phenoxides are those of the metal belonging to the Groups IA, IIA, IIB, IIIB, IVA, IVB, VA, VIA, VIIA and VIII of the periodic table and alkoxides and phenoxides having at most 30 carbon atoms and a compound having at least one alkoxy or phenoxy group.

Examples of the metal alkoxides and phenoxides are lithium isoproside, sodium ethoxide, magnesium diethoxide, barium diethoxide, zinc diethoxide, boron triisoproxide, aluminum isopropoxide, gallium trimethoxide, silicon tetraethoxide titanium tetraisopropoxide, tungsten hexaisopropoxide, manganese diethoxide, iron triethoxide, magnesium diphenoxide, monoethoxy magnesium chloride, triethoxy zirconium chloride and triethoxy vanadate.

The metal salts are those of metals belonging to the Groups IA, IB, IIA, IIB, IIIA, IIIB, IVA, IVB, VA, VB, VIA, VIIA and VIII of the periodic table, rare earth elements and radioactive elements and sulfates (including bisulfates, oxysulfates, double salts of ammonium sulfate and metal sulfate and double salts of these sulfates), sulfites (including bisulfites), thiosulfates, phosphates (including hydrogen phosphates, double salts of ammonium phosphates and metal phosphates and double salts of these phosphates), phosphites (including metaphosphates), carbonates, bicarbonates, nitrates, nitrites (including double salts of the nitrates), cyanides and thiocyanides.

Examples of the metal salts are magnesium sulfate, stannous sulfate, ferrous ammonium sulfate, aluminum sodium sulfate, titanium oxysulfate, vanadium oxysulfate, sodium sulfite, silver sulfite, potassium bisulfite, sodium thiosulfate, sodium phosdihydron phosphate, potassium phosphite, nickel carbonate, potassium bicarbonate, chromium nitrate, barium nitrate, silver cyanate, mercury cyanide and cuprothiocyanide. The metal salts may contain water of crystallization.

The reactive group-containing polymers whose molecular chain contains at least one reactive group include a polymer containing a hydroxyl group, a polymer containing a carboxyl group, a polymer containing an ester group, a polymer containing an acid amide group, a polymer containing an amino group, a polymer containing an isocyanato group, a polymer containing a nitrile group, a polymer containing an acid halogen group, a polymer containing an oxygen-bearing heterocyclic ring, a polymer containing a sulfur-bearing heterocyclic ring, a polymer containing a nitrogen-bearing heterocyclic ring, a polymer containing a peptide group, a polymer containing a thiol group, a polymer containing a carbonyl group, and a polymer consisting of a sulfurbearing vinyl compound. It is known that these polymers are molded into various articles of use as an adhesive or coating agent. The method of this invention further permits the use of stereospecific, nonsterospecific or block copolymers obtained by using a monomer containing a reactive group. Graft polymers formed by grafting a compound containing a reactive group to polymers free from a reactive group such as polyethylene, polypropylene and polystyrene or polymers modified by a compound containing a reactive group are also included in this invention. It is desirable to use the polymers whose molecular chain contains at least one reactive group which generally have a degree of polymerization of 30 to 10000, preferably 100 to 700 and also have at least 10 reactive groups per 1000 carbons of its main chain in view of its polymerization activity.

Examples of these polymers are described in the specification of Japanese Patent Application Laid Open No. 53672/74.

When the aforesaid third component is used as a part of the catalyst system in this invention, the proportion thereof depends on the kind used but it is generally less than 50 moles, usually less than 30 moles per atom equivalent of tungsten and/or molybdenum contained in the catalyst. If the third component is used in an amount larger than 50 moles per atom equivalent of the metal component, it does not further increase the polymerization activity of the catalyst.

The amount of the catalyst system used in the ring-opening polymerization of this invention depends upon the kind of catalyst and the kind of monomer used but in general it is preferably that the number of gram atoms of tungsten and/or molybdenum is 0.001 – 100, more preferably 0.005 – 50, and particularly 0.01 – 10 per 1000 moles of the number of monomer. If the gram atoms of the metal is less than 0.001 per 1000 moles of the monomer, the catalyst does not show sufficient polymerization activity. On the other hand, if the atom equivalents of metal are higher than 100 per 1000 moles of the monomer, the removal of the catalyst after polymerization becomes difficult and also the polymer obtained is greatly colored.

In the present invention, the aforesaid monomer may be subjected to ring-opening polymerization using the catalyst system prepared from the above-mentioned organometallic compound and the reaction product of the oxide and the phosphorus compound or these compounds and the aforesaid third components in the absence of an inert organic solvent (that is, a bulk polymerization), but the ring-opening polymerization may be carried out in an inert organic solvent. It is as a matter of course required that the organic solvent used in the polymerization does not injure the catalyst system and does not cause reaction with the monomer or monomers used in this invention. It is particularly preferable to use as the solvent the inert organic solvent as used in the production of the reaction product of the oxide and the phosphorus compound. Thus, typical examples of the inert organic solvent are those illustrated in the case of showing the inert organic solvent used for producing the reaction products of the oxides and the phosphorus compounds. The organic solvents may be used individually or as a mixture of them.

When the ring-opening polymerization is carried out in the above-described inert organic solvent, the proportion of the organic solvent is generally at most 20 volume parts, preferably 10 volume parts per volume part of the monomer or monomers. If the porportion of the solvent is higher than 20 volume parts per volume part of the monomer, it becomes troublesome to recover the ring-opening polymerization product obtained after the polymerization is finished. Furthermore, the recovery of the organic solvent used is also troublesome.

The polymerization temperature is generally from $-100°$ to $200°$ C., preferably from $-50°$ to $150°$ C., and most preferably from $0°$ to $130°$ C. If the polymerization temperature is lower than $-100°$ C., the rate of polymerization is quite low owing to the insufficient polymerization activity in the polymerization system and thus it requires a long period of time to finish the ring-opening polymerization. In this case, further, the mixture of the monomer and the aforesaid inert organic solvent, is as the case may be, solidified. On the other hand, if the polymerization temperature is higher than $200°$ C., it becomes sometimes difficult to control sufficiently the polymerization.

It is preferred to carry out the ring-opening polymerization of this invention in an inert gas atmosphere such as argon and nitrogen. If the oxygen and moisture are present in the polymerization system, the catalyst system is partially or wholly degraded, which makes it impossible to obtain reproducible results.

By carrying out the ring-opening polymerization in the manner as described above, the desired ring-opening polymerization products can be obtained and in this case, the molecular weight of the ring-opening polymerization products obtained can be controlled properly by adding to the polymerization system a molecular weight controlling agent such as α-olefins having at most 15 carbom atoms (e.g., ethylene, propylene, butene-1, hexene-1, and octene-1); internal olefins having at most 20 carbon atoms (e.g., butene-2, hexene-2, and octene-2); conjugated diolefins having at most 20 carbon atoms and the halogen-substituted conjugated diolefins (e.g., butadiene, isoprene, and chloroprene); and non-conjugated diolefins having at most 20 carbon atoms (e.g., 1,4-hexadiene). Other examples of the molecular weight controlling agents are acetylene compounds having at most 20 carbons atoms such as 1-pentyne, 2-pentyne, 3-methyl-1-butyne 1-hexane, 1-butylacetylene, 1-heptyne, 3-octyne, 1-decyne, vinylacetylene, 1,5-hexa-diine, 1,8-nona-diine, and 1,9-deca-diine, allene compounds having at most 20 carbon atoms such as allene, methylallene, ethylallene, trimethylallene, and tetramethylallene, triolefin compounds having at most 20 carbon atoms such as 1,3,5- heptatriene, 1,3,5-octatriene, 1,3,5,7-octatetriene, 3-methyl-1,3,5 heptatriene, 3,4-dimethyl-1,3,5-heptatriene, and 1,3,6-octatriene, allyl compounds having at most 20 carbon atoms such as allyl alcohol, allyl ether, allylethyl ether, allylphenyl ether, allylamine, diallylamine, allyl chloride, allyl methacrylate, diallyl oxalate, diallyl malonate, and diallyl phthalate, as described in the specifications of Japaby graft polymerizing at least one of styrene, acrylonitrile, vinyl chloride, and methyl methacrylate to the rubber-like material as shown below; butadiene rubbers containing butadiene as the main component; chlorinated polyethylenic rubber-like materials; acrylate rubber-like materials; ethylene-vinyl acetate copolymer rubber-like materials; and chloroprene rubbers. Moreover, the properties of the ring-opening polymerization products or the ring-opening graft and/or block polymerization products produced by the process of this invention can further be improved by adding thereto additives generally used for improving the properties of synthetic resins, such as stabilizers to light (ultraviolet rays), heat, oxygen, and ozone; a flame retarder; a lubricant; a filler; a reinforcing agent; an impact resistance improving agent (e.g., a metal salt of a carboxylic acid); a coloring agent; an antistatic agent; and a foaming agent.

The ring-opening polymerization products, the ring-opening graft and/or block polymerization products, and the aforesaid blends of these polymerization products obtained in this invention may be utilized as is and may also be molded into various forms such as pellets, films, sheets, pipes, rods, containers, etc., by applying thereto a molding method generally employed for synthetic resins, such as a compression molding method, an extrusion molding method, an injection molding method, and a blow molding method.

Also, the aforesaid ring-opening polymerization products, the ring-opening graft and/or block polymerization products, or the blends of them can be utilized as graft polymers by graft polymerizing thereto a vinyl compound such as styrene, vinyl chloride, acrylonitrile, and methyl methacrylate or further they may be subjected to a reaction for increasing the molecular weight thereof.

Since, as mentioned above, the ring-opening polymerization products and the like obtained by the process of this invention have various merits and can be molded into various forms by employing the aforesaid molding method, they can be used in various fields, such as, for example, containers such as a bottle; films and secondary fabrication products thereof (e.g., bags and packaging materials); daily necessaries; machine parts; parts for electric equipment and illuminators; pipes; and agricultural devices and parts thereof.

Furthermore, the ring-opening polymerization products and the ring-opening graft and/or block polymerization products obtained by the process of this invention can be used, as is or after increasing the molecular weight, as ion-exchange resins, coagulating agents, adhesives, and coating materials.

The the invention will further be explained more in detail by the following examples. In addition, in the examples and comparative examples, the reduced viscosity was measured at a temperature of 30° C. and at a concentration of 0.1 g/dl. using dimethylformamide or 1,2-dichloroethane as the solvent.

EXAMPLE 1

Into a 500 milliliter three-necked flask, the inside of which was completely replaced with nitrogen, were charged 35.1 g (0.152 mole) of tungsten trioxide, 37.9 g (0.182 mole) of phosphorus pentachloride, and 100 ml. of o-dichlorobenzene and after raising the temperature of the reaction system to 120° C., the reaction was carried out for 30 minutes at the temperature while vigorously stirring the reaction system. The solution portion (the supernatant liquid charged from colorless to deep red and in this case a considerable amount of yellow precipitate was left at the bottom of the flask. The concentration of tungsten in the solution portion was confirmed to be 0.40 mole/liter by a fluorescent X-ray measurement.

Then, in a one liter glass autoclave, the inside of which was completely replaced with nitrogen, were placed 1.0 ml. (0.40 millimole as metallic tungsten) of the supernatant liquid of the reaction product (the reaction product of tungsten trioxide and phosphorus pentachloride), 250 ml. of 1,2-dichloroethane (prepared by predrying a high-grade commercially available product over calcium hydride and then rectifying it, the rectified product contained about 5-7 ppm. of water, the product was also used in the examples), 150 g. of 5-cyano-bicyclo [2,2,1]-heptene-2 (higher than 99.9% purity measured by gas chromatography, contained 60% endo type) as the monomer, and 6.0 ml. of a 1,2-dichloroethane solution of 1.0 mole/liter of diethylaluminum chloride and then the polymerization was carried out for 60 minutes at 70° C. while stirring well.

After the polymerization was over, the polymerization system was allowed to cool to about room temperature and after adding 150 ml. of the aforesaid 1,2-dichloroethane, insoluble matters were filtered away using a glass filter. To the filtrate was added 0.5 g. of bis(2-hydroxy-3-tert-butyl-5-methylphenyl)methane and the mixture was poured into an amount of methanol of five times the amount of 1,2-dichloroethane to precipitate the polymer formed. The polymer was recovered by filtration, washed well with methanol, and then dried overnight at 50° C. under a reduced pressure, whereby 78 g of a faint-yellow polymer was obtained. The polymerization activity was 1,060 (g/g-w.hr) and the reduced viscosity (solvent: dimethylformamide) of the polymer was 1.43.

EXAMPLE 2

The reaction product of the oxide and phosphorus pentachloride was prepared by carrying out the reaction as in Example 1 for 60 minutes at room temperature with stirring, except for using, 21.9 g. (0.152 mole) of molybdenum trioxide in place of tungsten trioxide. The color of the supernatant liquid changed to red purple and a considerable amount of white precipitate was left at the bottom of the flask. The concentration of molybdenum in the supernatant was confirmed to be 0.38 g./liter by a fluoresent X-ray measurement.

The same polymerization procedure as in Example 1 was followed using, however, 2.0 ml. (0.76 millmole as metallic molybdenum) of the supernatant liquid of the reaction product prepared in the above step in place of the reaction product used in Example 1. After the polymerization was over, the polymer formed gas recovered (post-treatment) as in Example 1. Thus, 68 g. of a faint-yellow polymer was obtained. The polymerization activity was 933 (g/g-Mo.hr) and the reduced viscosity of the polymer (solvent: dimethylformamide) was 1.09.

COMPARATIVE EXAMPLE 1

The same polymerization procedure and post-treatment as in Example 1 were followed except that phosphorus petachloride was not used in producing the reaction product, but no polymer was obtained.

nese Patent Application Laid Open Nos. 56,494/'75; 56,495/'75; 56,496/'75; and 56,497/'75.

In the case of using the molecular weight controlling agent, the proportion of it is generally at most 20 moles, preferably less than 10 moles, most preferably less than 5 moles per 100 moles of the monomer used for the ring-opening polymerization.

The ring-opening polymerization of this invention may be effectively carried out in the absence of an unsaturated polymer but may further be carried out in the presence of an unsaturated polymer.

The unsaturated polymer used for the purpose has a carbon-carbon double bond in the polymer. Examples of the unsaturated polymers are butadiene rubbers containing butadiene as the main component (generally more than 50 % by weight), such as a butadiene homopolymer rubber, a styrene-butadiene copolymer rubber, and an acrylonitrile-butadiene copolymer rubber, chloroprene, rubbers, isoprene rubbers, natural rubbers, ethylene propylene-diene ter-polymers (generally called EPT or EPDM). Furthermore, cycloolefinic rubber-like materials prepared by ring-opening polymerizing cycloolefinic compounds may be used for the purpose.

When the ring-opening polymerization of this invention is carried out in the presence of the aforesaid unsaturated polymer, the Mooney viscosity thereof is generally 10 – 200, preferably 20 – 150, more preferably 30 – 130. Also, it is preferred that the unsaturated polymer has at least one carbon-carbon double bond, more preferably more than 10 carbon-carbon double bonds per 1,000 total carbon-carbon bonds. This processes of producing these unsaturated polymers and the properties thereof are described in Kanbara et al; "Synthetic Rubber Handbook", 1967, published by Asakura Shoten.

The unsaturated polymers used in this invention may be random copolymer rubber-like materials or block copolymer rubber-like materials as in case of, for example, styrene-butadiene copolymer rubber-like materials.

In the case of carrying out the ring-opening polymerization of this invention in the presence of the unsaturated polymer, the proportion of the unsaturated polymer is generally at most 1,000 parts by weight, preferably less than 500 parts by weight, more preferably less than 300 parts by weight per 100 parts by weigh of the monomer used. If the proportion of the unsaturated polymer is more than 1000 parts by weight per 100 parts by weight of the monomer, a polymerized product showing the excellent properties is not obtained.

In the practice of the ring-opening polymerization of this invention in the presence of the unsaturated polymer, the polymer is used as a solution or suspension (dispersion) thereof in the monomer or a mixture of the monomer and the aforesaid inert organic solvent. Furthermore, the ring-opening polymerization may be block polymerization, graft polymerization, or a combination of graft polymerization and block polymerization.

The graft or block polymerization product obtained by practicing the ring-opening polymerization of this invention in the presence of the unsaturated polymer is excellent in impact resistance as compared with the ring-opening polymerization product obtained by practicing the ring-opening polymerization of this invention in the absence of the unsaturated polymer, although the extent of the improved impact resistance may differ with different proportions of the unsaturated polymer employed and thus is particularly useful in the field in which high impact resistance is required.

After the ring-opening polymerization is over, the polymer obtained can be recovered by various manners. In an example of the recovering processes, the catalyst removal method and polymer recovery method which are usually employed in the solution polymerization of isoprene or butadiene may be applied. For example, there is a process in which a solution containing the ring-opening polymerization product, the unreacted monomer and the catalyst is added to a lower alcohol (e.g., methanol and ethanol) or the alcohol containing a small amount of hydrochloric acid, whereby the catalyst is removed and at the same time the ring-opening polymerization product obtained is precipitated and a process in which an organic solvent solution containing the ring-opening polymerization product, the unreacted monomer, and the catalyst is uniformly mixed with an inert organic solvent (e.g., methylene chloride) which is immiscible with water, the resultant mixture is treated with water containing a chelating agent (e.g., ethylenediamine tetraacetic acid and nitrilotriacetic acid) and, after removing the catalyst, the organic solvent is removed from the reaction mixture. Other purification processes (post-treatments) which can be employed for recovering the ring-opening polymerization products of this invention are described in the specifications of Japanese Patent Application Laid Open Nos. 100,500/'73; 67,999/'74; 77,999/'75; 130,500/'74; and Japanese Patent Application Nos. 119,968/'73; 123,329/'73 9208/'74; 68,680/'74; 61,851/'74; 69,243/'74; and 125,981/'74.

As mentioned above, in the case of producing the ring-opening polymerization products having excellent physical properties (e.g., impact resistance and low-temperature impact resistance) and other excellent properties such as moldability and transparency, the ring-opening polymerization products having high adhesive property, or the ring-opening polymerization products useful as ion-exchange resins or coagulating agents according to the process of this invention, the yield for the ring-opening polymerization product per unit amount of catalyst is high owing to the quite high polymerization activity. Thus, since a comparatively small amount of catalyst can be used for producing a definite amount of a ring-opening polymerization product, the amount of the catalyst can be reduced as well as the ring-opening polymerization product obtained can be quite easily purified or as the case may be, the purification of the product may be omitted. Furthermore, according to this invention, the ring-opening polymerization products (graft and/or block polymerization products) having more excellent impact resistance and low-temperature impact resistance can be obtained by carrying out the ring-opening polymerization (graft and/or block polymerization) in the presence of the unsaturated polymer.

Since the ring-opening polymerization products obtained by the process of this invention have excellent properties as mentioned above, they may be used as they are for various purposes but they may be blended, according to the purposes, with one or more additives having compatibility with the ring-opening polymerization products or ring-opening graft and/or block polymerization products, such as vinyl chloride polymers; a styrene homopolymer; copolymers obtained by copolymerizing at least two monomers of styrene, acrylonitrile, and methyl methacrylate; graft polymers obtained

COMPARATIVE EXAMPLE 2

The same polymerization procedure and post-treatment as in Example 1 were followed except that 93 mg. (0.40 millimole) of tungsten trioxide and 100 ml. (0.48 millimole) of phosphorus pentachloride were each separately added into the autoclave in place of the supernatant of the reaction product of tungsten trioxide and phosphorus pentachloride used as a catalyst component in Example 1. Thus, 12 g. of polymer was obtained. The polymerization activity was 163 (g/g-w.hr).

EXAMPLE 3

The same polymerization procedure as in Example 1 was followed except that another organometallic compound as shown in Table 1 was used in place of diethylaluminum chloride used in the polymerization in Example 1 and also the polymerization temperature as shown in Table 1 was employed. After the polymerization was over, the polymer formed was recovered in each case. The polymerization activity and the reduced viscosity (solvent: dimethylformamide) of the polymer are also shown in Table 1.

Table 1

| No. | Polymerization temp. (° C) | Organometallic[1] compound | Polymerization activity (g/g-w.hr) | Reduced viscosity |
|---|---|---|---|---|
| 1 | 50 | Triethylaluminum | 978 | 1.20 |
| 2 | 80 | Ethylaluminum sesquichloride | 876 | 0.90 |
| 3 | 50 | $Al(C_2H_5)_3/H_2O$[2] | 917 | 1.17 |
| 4 | 60 | $(CH_3)_3SiOAl(C_2H_5)_2$[3] | 876 | 1.05 |
| 5 | 70 | $(C_2H_5)_2NAl(C_2H_5)_2$[4] | 795 | 0.98 |
| 6 | 70 | Diethylzinc | 889 | 1.11 |
| 7 | 70 | Tetraethyltin | 805 | 1.05 |
| 8 | 70 | Diethylmagnesium | 766 | 1.01 |

1): Mole number same as in Example 1 as the concentration of metal atom.
2): The reaction product of 2 moles of triethylaluminum and 1 mole of water.
3): The reaction product of 1 mole of trimethyl silanole and 1 mole of triethylaluminum.
4): The reaction product of 1 mole of diethylamine and 1 mole of triethylaluminum.

EXAMPLE 4

The same reaction procedure for producing the reaction product as in Example 1 was followed except that the amount of phosphorus pentachloride used in producing the reaction product in Example 1 was changed or the reaction component shown in Table 2 was used in place of phosphorus pentachloride.

Then, the same polymerization procedure as in Example 1 was followed except that the reaction product formed in the above step was used in place of the reaction product used in Example 1. After the polymerization was over, the polymer obtained was recovered as in Example 1 in each case. In this case, the atomic equivalent of metallic tungsten used was the same as in Example 1. The results are also shown in Table 2.

Table 2

| | Reaction component | Amount | Polymerization result | | |
| No. | Kind | (mole) | (A) (g) | (B) | (C) |
|---|---|---|---|---|---|
| 1 | Phosphorus pentachloride | 0.364 | 81 | 1,100 | 1.34 |
| 2 | Phosphorus pentabromide | 0.500 | 74 | 999 | 0.98 |
| 3 | Phosphorus pentafluoride | 0.500 | 72 | 978 | 1.02 |
| 4 | Phosphorus oxytrichloride | 0.182 | 68 | 917 | 0.97 |
| 5* | Aluminum trichloride | 0.182 | 42 | 571 | 1.18 |
| 6* | Phosphorus trichloride | 0.182 | 29 | 387 | 0.80 |

*Comparative example
(A): Yield,
(B): Polymerization activity (g/g-w.hr),
(C): Reduced viscosity (solvent: dimethylformamide).

EXAMPLE 5

The same polymerization procedure as in Example 1 was followed except that after adding to the autoclave diethylaluminum chloride used in the polymerization in Example 1, the molecular weight controlling agent as shown in Table 3 was added in an amount of 1.0 mole% based on the amount of the monomer. After the polymerization was over, the polymer formed was recovered as in Example 1 in each case. The results are shown in Table 3.

Table 3

| No. | Molecular weight controlling agent | Polymerization activity (g/g-w.hr) | Reduced viscosity[1] |
|---|---|---|---|
| 1 | Hexene-1 | 999 | 0.45 |
| 2 | Butadiene | 1,019 | 0.57 |

1): Solvent dimethylformamide.

EXAMPLE 6

The same polymerization procedure as in Example 1 was followed except that the monomers shown in Table 4 were used in place of the monomer used in Example 1. The polymer formed was recovered as in Example 1 in each case. The results are shown in Table 4.

Table 4

| No. | Kind of monomer | Polymerization activity (g/g-w.hr) | Reduced viscosity[1] |
|---|---|---|---|
| 1 | 5-Cyano-5-methyl-bicyclo[2,2,1]-heptene-2 | 1,365 | 1.22[a] |
| 2 | 5-Acetoxy-bicyclo[2,2,1]-heptene-2 | 978 | 0.85[a] |
| 3 | 5,6-Dimethoxycarbonyl-bicyclo- | 1,039 | 0.70[a] |

Table 4-continued

| No. | Kind of monomer | Polymerization activity (g/g-w.hr) | Reduced viscosity[1] |
|---|---|---|---|
| 4 | 5-Methoxymethylbicyclo[2,2,1]-heptene-2 [2,2,1]-heptene-2 | 978 | 0.69[a] |
| 5 | 5-Chloromethyl-bicyclo[2,2,1]-heptene-2 | 876 | 0.80[b] |
| 6 | 5,5-Dichloro-bicyclo[2,2,1]-heptene-2 | 815 | 1.11[b] |
| 7 | N-Phenyl-3,6-methylene-1,2,3,6-tetrahydro-cis-phthalimide | 1,182 | 1.05[b] |
| 8 | 2,3-Diethoxycarbonyl-bicyclo[2,2,1]-hepta-2,5-diene | 1,264 | 1.17[a] |
| 9 | N,N-Diethyl-bicyclo[2,2,1]-heptene-2-carbonamide-5 | 937 | 0.94[a] |
| 10 | 5-(4-Quinolyl)-bicyclo[2,2,1]-heptene-2 | 998 | 0.81[a] |
| 11 | 3,6-Methyiene-1,2,3,6-tetrahydro-cis-phthalic anhydride | 1,283 | 0.97[a] |
| 12 | N-Butyl-3,6-methylene-1,2,3,6-tetrahydro-cis-phthalimide | 1,121 | 1.07[a] |
| 13 | 5-(2-Pyridyl)-bicyclo[2,2,1]-heptene-2 | 876 | 0.81[a] |
| 14 | 1,4-Dihydro-1,4-methanonaphthalene | 897 | 0.78[b] |
| 15 | Cyclopentene[2] | 1,590 | 2.05[b] |
| 16 | 1,5-Cyclooctadiene[2] | 1,202 | 1.98[b] |
| 17 | Bicyclo[2,2,1]-heptene-2[2] | 1,365 | 1.88[b] |

[1] [a]Solvent dimethylformamide
[b]Solvent 1,2-dichloroethane
[2]Polymerized at 30° C

EXAMPLE 7

The same procedure for producing the reaction product as in Example 1 was followed except that the oxides shown in Table 5-1 were used in place of the tungsten trioxide used in the production of the reaction product used in Example 1. Then, the same polymerization procedure as in Example 1 was followed except that the reaction product prepared in the above step was used in place of the reaction product in Example 1. In this case, the atomic equivalent of metallic tungsten or molybdenum in the supernatant liquid of the reaction product was the same as that in Example 1. After the polymerization was over, the polymer was recovered in each case. The results are shown in Table 5-1.

Then, the same procedure for producing the reaction product as mentioned above was followed except that phosphorus pentachloride was not used. Then, the same polymerization procedure as described above was followed. After the polymerization was over, the polymer formed was recovered and the results are shown in Table 5-2.

Table 5-1

| No. | Oxide Kind | Amount (g) | Polymerization activity (g/g-w or g-mo.hr) | Reduced viscosity[1] |
|---|---|---|---|---|
| 1 | Tungsten dioxydichloride | 40.5 | 1,019 | 1.40 |
| 2 | Tungsten oxytetrachloride | 60.3 | 1,080 | 1.38 |
| 3 | Molybdenum oxytrichloride | 45.0 | 836 | 1.12 |

[1]Solvent dimethylformamide

Table 5-2

| No. | Oxide Kind | Amount (g) | Polymerization activity (g/g-w or g-mo.hr) | Reduced viscosity[1] |
|---|---|---|---|---|
| 1 | Tungsten dioxytrichloride | 40.5 | 0 | — |
| 2 | Tungsten oxytetrachloride | 60.3 | 0 | — |
| 3 | Molybdenum oxytrichloride | 45.0 | 0 | — |

[1]Solvent dimethylformamide

COMPARATIVE EXAMPLE 3

The same procedure for producing the reaction product as in Example 1 was followed except that tungsten trioxide used for producing the reaction product in Example 1 was not used. The same polymerization procedure as in Example 1 was followed except that the reaction product obtained in the above step was used. In this case, however, no polymer was obtained.

COMPARATIVE EXAMPLE 4

The same polymerization procedure as in Example 1 was followed except that the oxides shown in Table 6 were used in an amount of 0.40 millimole in place of the supernatant liquid of the reaction product used in Example 1. After the polymerization was over, the polymer was recovered in each case, the results being shown in Table 6.

Table 6

| No. | Oxide | Polymerization activity (g/g-w or g-Mo.hr) | Reduced viscosity[1] |
|---|---|---|---|
| 1 | Tungsten trioxide | 0 | — |
| 2 | Molybdenum trioxide | 0 | — |
| 3 | Tungsten dioxydichloride | 102 | 0.49 |
| 4 | Tungsten oxytetrachloride | 163 | 0.40 |
| 5 | Molybdenum oxytrichloride | 61 | 0.55 |

[1]Solvent dimethylformamide

COMPARATIVE EXAMPLE 5

The same polymerization procedure as in Example 1 was followed except that 2.0 ml. of a 1,2-dichloroethane solution of 0.2 mole/liter of tungsten hexachloride was used in place of the supernatant liquid of the reaction product used in Example 1. After the reaction was over, the polymer formed was recovered. The polymerization activity was 713 (g/g-w.hr) and the reduced viscosity of the polymer obtained was 1.21 (solvent dimethylformamide).

COMPARATIVE EXAMPLE 6

The same polymerization procedure as in Comparative example 5 was followed except that the organoaluminum chlorides shown in Table 7 were used in place of the diethylaluminum chloride used as the organoaluminum compound in Comparative example 5. After the polymerization was over, the polymer obtained was recovered in each case. The results obtained are shown in Table 7.

Table 7

| No. | (A) | Organoaluminum compound[1] | Polymerization activity (g/g-w.hr) | Reduced viscosity |
|---|---|---|---|---|
| 1 | 50 | Triethylaluminum | 571 | 0.98 |
| 2 | 80 | Ethylaluminum sesquichloride | 442 | 0.70 |
| 3 | 50 | $Al(C_2H_5)_3/H_2O$ [2] | 407 | 1.09 |
| 4 | 60 | $(CH_3)_3SiOAl(C_2H_5)_2$ [3] | 510 | 1.02 |
| 5 | 70 | $(C_2H_5)_2NAl(C_2H_5)_2$ [4] | 428 | 0.89 |

(A) Polymerization temperature,
[1] The same mole number as in Example 1 as the concentration of aluminum.
[2] The reaction product of 2 moles of triethylaluminum and 1 mole of water,
[3] The reaction product of 1 mole of trimethylsilanole and 1 mole of triethylaluminum,
[4] The reaction of 1 mole of diethylamine and 1 mole of triethylaluminum.

EXAMPLE 8

The same polymerization procedure as in Example 1 was followed except that 150 g. of a mixed solution of 70 mole% of 5-cyano-bicyclo-[2,2,1]-heptene-2 and 30 mole% of the monomer shown in Table 8 was used in place of 5-cyano-bicyclo[2,2,1]-heptene-2 as the monomer in Example 1. After the polymerization was over, the polymer formed was recovered in each case. The results are shown in Table 8.

Table 8

| No. | Monomer | Copolymerization ratio[1] | Polymerization activity (g/g-w.hr) | Reduced viscosity[2] |
|---|---|---|---|---|
| 1 | Monomer (A)[3] | 79 | 1,019 | 1.30 a) |
| 2 | Monomer (B)[4] | 77 | 978 | 1.09 a) |
| 3 | Monomer (C)[5] | 56 | 1,202 | 0.88 b) |
| 4 | Monomer (D)[6] | 51 | 1,243 | 0.97 b) |
| 5 | Monomer (E)[7] | 78 | 978 | 1.00 a) |
| 6 | Monomer (F)[8] | 71 | 1,080 | 0.98 b) |
| 7 | Monomer (G)[9] | 63 | 1,223 | 0.87 b) |
| 8 | Monomer (G)[10] | 75 | 1,182 | 1.08 b) |

[1] The copolymerization ratio of 5-cyan.-bicyclo[2,2,1]- heptene-2 in the copolymer obtained, mole%.
[2] a) Solvent dimethylformamide
   b) Solvent 1,2-dichloroethane
[3] 5-Cyano-5-methyl-bicyclo[2,2,1]-heptene-2,
[4] 5-Methyl-5-methoxycarbonyl-bicyclo[2,2,1]-heptene-2,
[5] Bicyclo[2,2,1]-heptene-2,
[6] Cyclopentene,
[7] 5-(2-Pyridyl)-bicyclo[2,2,1]-heptene-2,
[8] 1,4-Dihydro-1,4-methanonaphthalene,
[9] 1,5-Cyclooctadiene,
[10] 2,3-Diethoxycarbonyl-bicyclo[2,2,1]-hepta-2,5-diene

EXAMPLE 9

Into a one liter glass autoclave, the inside of which was completely replaced with nitrogen, was charged 20.0 g. of cis-1,4-polybutadiene, JSR BR-01 (trade name, made by Nippon Synthetic Rubber Co., Mooney viscosity 45 ($ML_{1+4}$, 100° C), cis-1,4 content 97.5%) which was reprecipitated from toluene and methanol and dried overnight at about 60° C. under a reduced pressure and then 500 ml. of 1,2-dichloroethane was added thereto followed by drawing to dissolve the polybutadiene completely. The, to the solution thus prepared was added 30.0 g. of 5-cyano-bicyclo [2,2,1]-heptene-2 as the monomer followed by stirring well and after adding thereto 5.0 ml. of the supernatant liquid of the reaction product as used in Example 1 and 10.0 ml. of a 1,2-dichloroethane solution of 1.0 mole/liter of diethylaluminum chloride, the polymerization was carried out for 120 minutes at 70° C with stirring.

After the polymerization was over, the polymer formed was recovered as in Example 1. Thus, 48.0 g. of the polymer was obtained. When the polymer was subjected to an infrared absorption spectrum analysis, the characteristic absorption of 5-cyano-bicyclo[2,2,1]-heptene-2 and the characteristic absorption of polybutadiene were observed. The polymer obtained was soluble in toluene although the homopolymer of 5-cyano-bicyclo[2,2,1]-heptene-2 was insoluble in toluene. Furthermore, when an extraction was tried using n-heptane which was a solvent for polybutadiene, no extraction product was observed. From the above facts, it was clear that the polymer obtained was the copolymer of 5-cyano-bicyclo[2,2,1]-heptene-2 and polybutadiene and the copolymer contained almost no polybutadiene homopolymer and the ring-opening homopolymerization product of 5-cyano-bicyclo[2,2,1]-heptene-2.

EXAMPLE 10

The same polymerization procedure as in Example 1 was followed except that after adding the reaction product used in carrying out the polymerization in Example 1 to the reaction system, the compound (as the third component for the catalyst) as shown in Table 9 was added to the reaction system and, after stirring the system vigorously for 10 minutes at room temperature, 1,2-dichloroethane was added to the reaction system. After the polymerization was over, the polymer was recovered in each case. The results are shown in Table 9.

Table 9

| No. | Third component for catalyst Kind | Amount[1] | Polymerization activity (g/g-w.hr) | Reduced viscosity[2] |
|---|---|---|---|---|
| 1 | Diethylacetal | 2.40 | 1,590 | 1.07 |
| 2 | Water | 1.80 | 1,427 | 0.90 |
| 3 | Isopropylamine | 2.40 | 1,406 | 1.35 |
| 4 | α-Chloroacetone | 1.80 | 1,529 | 1.19 |
| 5 | Triphenyl phosphine | 3.60 | 1,610 | 1.00 |
| 6 | Diethyl sulfide | 4.80 | 1,549 | 0.88 |
| 7 | Ethyl silicate | 2.40 | 1,813 | 1.25 |
| 8 | Ethyl silicate | 4.80 | 1,793 | 1.29 |
| 9 | Tris(β-Chloro-ethyl) phosphate | 4.80 | 1,945 | 1.20 |
| 10 | Tris(β-Bromoethyl) phosphate | 2.40 | 1,860 | 1.15 |
| 11 | Tris(2,3-dichloro-n-propyl)phosphate | 4.80 | 1,977 | 1.16 |

[1] millimole
[2] solvent dimethylformamide

COMPARATIVE EXAMPLE 7

The same polymerization procedure as in Example 10 – 9 was followed except that 2.0 ml. of a 1,2-dichloroethane solution of 0.2 mole/liter of tungsten hexachloride was used in place of the supernatant liquid of the reaction product used in Example 10 – 9. After the reaction was over, the polymer formed was recovered. The polymerization activity was 856 (g/g-w.hr) and the reduced viscosity of the polymer obtained was 1.21 (solvent dimethyl formamide).

EXAMPLE 11

The same procedure as that of producing the reaction product in Example 1 was followed except that the reaction was carried out for 2.5 hours at 150° C.

Then, in a one liter glass autoclave, the inside of which was completely replaced with nitrogen, were placed 1.0 ml. (0.40 millimole as metallic tungsten) of the supernatant liquid of the reaction product formed in the above step, 250 ml. of 1,2-dichloroethane and the kinds and amounts of the third components for the catalyst as shown in Table 10, and then they were vigorously stirred for 2 hours at the temperature as shown in Table 10. Then, 150 g. of 5-cyano-bicyclo[2,2,1]-heptene-2 and 3.0 ml. of a toluene solution of 1.0 mole/liter of triisobutylaluminum were added and then the polymerization was carried out for 60 minutes at 85° C while stirring well.

After the polymerization was over, the polymer was recovered in each case. The results are shown in Table 10.

Table 10

| No. | Third component Kind | Amount (g) | Reaction temperature (° C) | Polymerization activity (g/g-w.hr) |
|---|---|---|---|---|
| 1 | γ-Al$_2$O$_3$ | 1.5 | 70 | 1,698 |
| 2 | MgO | 1.0 | 70 | 1,861 |
| 3 | TiO$_2$ | " | " | 1,576 |
| 4 | Cr$_2$O$_3$ | " | " | 1,616 |
| 5 | V$_2$O$_5$ | " | 150 | 1,657 |
| 6 | MnO$_2$ | 5.0 | " | 1,780 |
| 7 | Fe$_2$O$_3$ | " | " | 1,739 |
| 8 | CuO | " | " | 1,685 |
| 9 | Cd$_2$O$_3$ | " | " | 1,617 |
| 10 | SiO$_2$ | 0.5 | 100 | 1,848 |
| 11 | Sb$_2$O$_3$ | " | " | 1,644 |
| 12 | SeO$_2$ | " | " | 1,563 |
| 13 | CeO$_2$ | " | " | 1,766 |
| 14 | SiO$_2$—Al$_2$O$_3$ | 5.0 | 150 | 1,902 |
| 15 | — | — | 70 | 1,100 |

EXAMPLE 12

The same polymerization procedure and post-treatment as in No. 1 of Example 11 was followed except that the monomers shown in Table 11 were used in place of the monomer used in Example 11. The results are shown in Table 11. The viscosity was measured by dimethylformamide.

Table 11

| No. | Kind of monomer | Polymerization activity (g/g-w.hr) | Reduced viscosity |
|---|---|---|---|
| 1 | 5-Methoxycarbonyl-bicyclo[2,2,1]-heptene-2 | 1,875 | 1.32 |
| 2 | 5-Methoxy-bicyclo[2,2,1]-heptene-2 | 1,630 | 1.20 |
| 3 | N,N-Dimethyl-bicyclo[2,2,1]-heptene-2-carbonamide-5 | 1,789 | 1.24 |
| 4 | 5-Chlor-bicyclo[2,2,1]-heptene-2 | 1,617 | 1.18 |
| 5 | 3,6-Methylene-1,2,3,6-tetrahydro-cis-phthalic anhydride | 1,658 | 1.19 |
| 6 | N-Methyl-3,6-methylene-1,2,3,6-tetrahydro-cis-phthalimide | 1,821 | 1.38 |
| 7 | 5-Phenyl-bicyclo[2,2,1]-heptene-2 | 1,753 | 1.27 |
| 8 | 5-(2'-Pyridyl)-bicyclo[2,2,1]-heptene-2 | 1,644 | 1.85 |
| 9 | 1,4-Hydroxy-1,4-methanonaphthalene | 1,916 | 1.15 |
| 10 | 2-Methoxycarbonyl-bicyclo[2,2,1]-heptadiene-2,5 | 1,698 | 1.47 |
| 11 | Cyclopentene | 1,980 | 1.03 |

EXAMPLE 13

The same procedure as that of producing the reaction product in Example 1 was followed except that the reaction was carried out for 30 minutes at 150° C.

Then, 1.0 ml. of the supernatant liquid of the reaction product formed in the above step and the kinds and amounts of the third components for the catalyst as shown in Table 12 were placed in a one liter glass autoclave, the inside of which was completely replaced with nitrogen, and then they were vigorously stirred for 5 hours at the temperatures as shown in Table 12. Then, 300 g. (2.5 moles) of 5-cyano-bicyclo[2,2,1]-heptene-2, 500 ml. of 1,2-dichloroethane and 6.0 ml. of a 1,2-dichloroethane solution of 1.0 mole/liter of diethylaluminum chloride were added and then the polymerization was carried out for 60 minutes at 85° C.

After the polymerization was over, the polymer was recovered in each case. The results are shown in Table 12.

Table 12

| No. | Third component Kind | Amount (g) | Reaction temperature (° C) | Polymerization activity (g/g-w.hr) |
|---|---|---|---|---|
| 1 | Mg(OH)$_2$ | 1.0 | 70 | 3,261 |
| 2 | Ti(OH)$_4$ | " | " | 3,002 |
| 3 | Mn(OH)$_2$ | " | " | 3,207 |
| 4 | Fe(OH)$_3$ | " | " | 2,826 |
| 5 | Ni(OH)$_2$ | " | 100 | 3,125 |
| 6 | Zn(OH)$_2$ | 5.0 | " | 2,948 |
| 7 | Al(OH)$_3$ | " | " | 2,717 |
| 8 | CuCO$_3$ · Cu(OH)$_2$ | " | " | 3,274 |
| 9 | LiOH | " | " | 2,663 |
| 10 | Sn(OH)$_4$ | 0.5 | 140 | 2,649 |
| 11 | Bi(OH)$_3$ | " | " | 2,853 |
| 12 | — | 0 | 70 | 1,793 |

EXAMPLE 14

The same polymerization procedure and post-treatment as in No. 1 of Example 13 was followed except that the monomers shown in Table 13 were used in place of the monomer used in Example 13. The results are shown in Table 13.

Table 13

| No. | Kind of monomer | Polymerization activity (g/g-w.hr) | Reduced viscosity |
|---|---|---|---|
| 1 | 5-Methoxycarbonyl-bicyclo[2,2,1]-Heptene-2 | 3,573 | 1.07 |
| 2 | 5-Methoxy-bicyclo[2,2,1]-Heptene-2 | 3,492 | 1.04 |
| 3 | N,N-Dimethyl-bicyclo[2,2,1]-heptene-2-carbonamide-5 | 3,125 | 1.28 |
| 4 | 5-Chlor-bicyclo[2,2,1]-heptene-2 | 3,016 | 1.25 |
| 5 | 3,6-Methylene-1,2,3,6-tetrahydro-cis-phthalic anhydride | 3,220 | 1.37 |
| 6 | N-Methyl-3,6-methylene-1,2,3,6-tetrahydro-cis-phthalimide | 3,478 | 1.13 |
| 7 | 5-phenyl-bicyclo[2,2,1-]-heptene-2 | 3,845 | 1.29 |
| 8 | 5-(2'-Pyridyl)-bicyclo[2,2,1]-heptene-2 | 2,962 | 1.32 |
| 9 | 1,4-Hydroxy-1,4-methanonaphthalene | 3,628 | 1.44 |
| 10 | 2-Methoxycarbonyl-bicyclo[2,2,1]- | 2,799 | 1.18 |

Table 13-continued

| No. | Kind of monomer | Polymerization activity (g/g-w.hr) | Reduced viscosity |
|---|---|---|---|
| 11 | heptadiene-2,5 Cyclopentene | 3,890 | 1.11 |

EXAMPLE 15

The same procedure as that of producing the reaction product in Example 1 was followed except that the reaction was carried out for 30 minutes at 150° C.

Then, 1.0 ml. of the supernatant liquid of the reaction product formed in the above step and the kinds and amounts of the third components for the catalyst as shown in Table 14 were placed in a one liter glass autoclave, the inside of which was completely replaced with nitrogen, and then they were vigorously stirred for 2 hours at the temperature as shown in Table 14. Then, 400 g. (3.36 moles) of 5-cyano-bicyclo[2,2,1]-heptene-2, 500 ml. of 1,2-dichloroethane and 6.0 ml. of a 1,2-dichloroethane solution of 1.0 mole/liter of diethylaluminum chloride were added and then the polymerization was carried out for 60 minutes at 85° C.

After the polymerization was over, the polymer was recovered in each case. The results as shown in Table 14.

Table 14

| No. | Third component Kind | Amount (g) | Reaction temperature (° C) | Polymerization activity (g/g-w.hr) |
|---|---|---|---|---|
| 1 | $MgCl_2$ | 1.0 | 75 | 3,845 |
| 2 | $AlCl_3$ | " | " | 4,212 |
| 3 | LiCl | " | " | 3,274 |
| 4 | $CuCl_2$ | " | " | 4,035 |
| 5 | $ZnCl_2$ | " | " | 3,573 |
| 6 | $CeF_3$ | 5.0 | " | 2,935 |
| 7 | $AlF_3$ | " | " | 4,103 |
| 8 | $TiCl_3$ | 2.0 | " | 3,913 |
| 9 | $SnCl_2$ | " | 50 | 3,533 |
| 10 | $VOCl_3$ | " | " | 3,872 |
| 11 | Mg(OH)Cl | 1.0 | " | 4,334 |
| 12 | $SbCl_3$ | " | " | 3,424 |
| 13 | $CrCl_6$ | " | " | 3,723 |
| 14 | $TeCl_4$ | " | " | 3,804 |
| 15 | $MnCl_2$ | " | 30 | 3,003 |
| 16 | — | — | — | 2,210 |

EXAMPLE 16

The same polymerization procedure and post-treatment as in No. 1 of Example 15 was followed except that the monomers shown in Table 15 were used in place of the monomer used in Example 15.

Table 15

| No. | Kind of monomer | Polymerization activity (g/g-w.hr) | Reduced viscosity |
|---|---|---|---|
| 1 | 5-Methoxycarbonyl-bicyclo[2,2,1]-heptene-2 | 4,022 | 1.29 |
| 2 | 5-Methoxy-bicyclo[2,2,1]-heptene-2 | 4,348 | 1.35 |
| 3 | N,N-Dimethyl-bicyclo[2,2,1]-heptene-2-carbonamide-5 | 3,628 | 1.41 |
| 4 | 5-Chlor-bicyclo[2,2,1]-heptene-2 | 3,451 | 1.47 |
| 5 | 3,6-Methylene-1,2,3,6-tetrahydro-cis-phthalic anhydride | 3,832 | 1.38 |
| 6 | N-Methyl-3,6-methylene-1,2,3,6-tetrahydro-cis-phthalimide | 3,981 | 1.40 |
| 7 | 5-Phenyl-bicyclo[2,2,1]-heptene-2 | 4,321 | 1.09 |
| 8 | 5-(2'-Pyridyl)-bicyclo[2,2,1]-heptene-2 | 3,668 | 1.21 |
| 9 | 1,4-Hydroxy-1,4-methanonaphthalene | 3,315 | 1.53 |
| 10 | 2-Methoxycarbonyl-bicyclo[2,2,1]-heptadiene-2,5 | 3,546 | 1.20 |
| 11 | Cyclopentene | 4,420 | 1.15 |

EXAMPLE 17

The same procedure as that of producing the reaction product in Example 1 was followed except that the reaction was carried out for 2.5 hours at 150° C.

Then, 1.0 ml of the supernatant liquid of the reaction product formed in the above step and the kinds and amounts of the third components for the catalyst as shown in Table 16 were placed in a one liter glass autoclave, the inside of which was completely replaced with nitrogen, and then they were vigorously stirred at the temperature as shown in Table 16. Then, 400 g. of 5-cyanobicyclo[2,2,1]-heptene-2, 500 ml. of 1,2-dichloroethane and 3.0 ml of a toluene solution of 1.0 mole/liter of triisobutylaluminum were added and then the polymerization was carried out for 60 minutes at 85° C.

After the polymerization was over, the polymer was recovered in each case. The results as shown in Table 16.

Table 16

| No. | Third component Kind | Amount (g) | Reaction temperature (° C) | Polymerization activity (g/g-w.hr) |
|---|---|---|---|---|
| 1 | Ethylene diamine.Mg | 1.0 | 75 | 3,777 |
| 2 | " | 5.0 | " | 3,628 |
| 3 | Ethylene diamine . Fe(II) | 1.0 | "3,261 | |
| 4 | Triethylene tetramine . Mn(II) | " | " | 3,899 |
| 5 | α,α'-Dipyridyl . Fe(II) | " | " | 3,967 |
| 6 | Citric acid . Cu(II) | " | " | 3,546 |
| 7 | Pyrophosphoric acid . Cu(II) | " | " | 3,614 |
| 8 | Salicyl aldehyde . Zn(II) | 2.0 | 60 | 3,981 |
| 9 | 8-Oxyquinoline . Cd(II) | " | " | 3,288 |
| 10 | Elio black T . Mg(II) | " | " | 3,438 |
| 11 | Nitroacetic acid . Be(II) | " | " | 3,913 |
| 12 | Sodium ethylene diamine tetra-acetic acid . Co | " | " | 3,668 |
| 13 | Nitroacetic acid . Al(III) | 5.0 | 30 | 3,601 |
| 14 | Ammonium triacetic acid . Cr | " | " | 3,274 |
| 15 | Acetyl acetonate . Ti(IV) | " | " | 3,016 |
| 16 | — | — | 1,725 | |

EXAMPLE 18

The same polymerization procedure and post-treatment as in No. 1 of Example 17 was followed except that the monomers shown in Table 17 were used in place of the monomer used in Example 17. The results are shown in Table 17.

Table 17

| No. | Kind of monomer | Polymerization activity (g/g-w.hr) | Reduced viscosity |
|---|---|---|---|
| 1 | 5-Methoxycarbonyl-bicyclo[2,2,1]-heptene-2 | 3,764 | 1.49 |
| 2 | 5-Methoxy-bicyclo[2,2,1]- | 4,130 | 1.37 |

Table 17-continued

| No. | Kind of monomer | Polymerization activity (g/g-w.hr) | Reduced viscosity |
|---|---|---|---|
|  | heptene-2 |  |  |
| 3 | N,N-Dimethyl-bicyclo[2,2,1]-heptene-2-carbonamide-5 | 4,293 | 1.28 |
| 4 | 5-Chlor-bicyclo[2,2,1]-heptene-2 | 3,274 | 1.36 |
| 5 | 3,6-Methylene-1,2,3,6-tetrahydro-cis-phthalic anhydride | 3,424 | 1.33 |
| 6 | N-Methyl-3,6-methylene-1,2,3,6-tetrahydro-cis-phthalimide | 3,927 | 1.44 |
| 7 | 5-Phenyl-bicyclo[2,2,1]-heptene-2 | 4,116 | 1.41 |
| 8 | 5-(2'-Pyridyl)-bicyclo[2,2,1]-heptene-2 | 4,307 | 1.20 |
| 9 | 1,4-Hydroxy-1,4-methanonaphthalene | 3,560 | 1.30 |
| 10 | 2-Methoxycarbonyl-bicyclo[2,2,1]-heptadiene-2,5 | 3,261 | 1.25 |
| 11 | Cyclopentene | 4,440 | 1.18 |

EXAMPLE 19

The same procedure as that of producing the reaction product in Example 1 was followed except that the reaction was carried out for 60 minutes at 150° C.

Then, 1.0 ml. of the supernatant liquid of the reaction product formed in the above step and the kinds and amounts of the third components for the catalyst as shown in Table 18 were placed in a one liter glass autoclave, the inside of which was completely replaced with nitrogen, and then they were vigorously stirred for 4 hours at the temperature as shown in Table 18. Then, 300 g. of 5-cyano-bicyclo[2,2,1]-heptene-2, 500 ml. of 1,2-dichloroethane and 6.0 ml. of a 1,2-dichloroethane solution of 1.0 mole/liter of diethylaluminum chloride were added and then the polymerization was carried out for 60 minutes at 75° c.

After the polymerization was over, the polymer was recovered in each case. The results are shown in Table 18.

Table 18

| No. | Third component Kind | Amount (g) | Reaction temp. (° C) | Polymerization activity (g/g-w.hr) |
|---|---|---|---|---|
| 1 | Mg(OC$_2$H$_5$) | 1.0 | 70 | 3,057 |
| 2 | " | 5.0 | 75 | 3,261 |
| 3 | Li(OiC$_3$H$_7$) | 1.0 | " | 2,812 |
| 4 | Ba(OC$_2$H$_5$)$_2$ | " | " | 2,976 |
| 5 | Zn(OC$_2$H$_5$)$_2$ | " | " | 3,179 |
| 6 | Mg(OC$_2$H$_5$)Cl | " | " | 3,057 |
| 7 | B(Oi . C$_3$H$_7$)$_3$ | " | " | 2,690 |
| 8 | Al(Oi . C$_3$H$_7$)$_3$ | 0.5 | 80 | 2,514 |
| 9 | Ga(OCH$_3$)$_3$ | " | " | 2,609 |
| 10 | Si(OC$_2$H$_5$)$_4$ | " | " | 2,989 |
| 11 | Ti(OiC$_3$H$_7$)$_4$ | " | " | 2,894 |
| 12 | Zr(OC$_2$H$_5$)$_3$Cl | " | " | 2,840 |
| 13 | Mg(OPh)$_2$ | 2.0 | 60 | 2,544 |
| 14 | Na(OC$_2$H$_5$) | " | " | 2,595 |
| 15 | V(OC$_2$H$_5$)$_3$ | " | " | 2,513 |
| 16 | W(OC$_3$H$_7$)$_6$ | 1.0 | 75 | 2,860 |
| 17 | Mn(OC$_2$H$_5$)$_2$ | " | " | 2,741 |
| 18 | Fe(OC$_2$H$_5$)$_3$ | " | " | 2,798 |
| 19 | — | — | — | 1,567 |

EXAMPLE 20

The same polymerization procedure and post-treatment as in No. 1 of Example 19 was followed except that the monomers shown in Table 19 were used in place of the monomer used in Example 19. The results are shown in Table 19.

Table 19

| No. | Kind of monomer | Polmerization activity (g/g-w.hr) | Reduced viscosity |
|---|---|---|---|
| 1 | 5-Methoxycarbonyl-bicyclo-[2,2,1]-heptene-2 | 2,826 | 1.29 |
| 2 | 5-Methoxy-bicyclo[2,2,1]-heptene-2 | 3,329 | 1.28 |
| 3 | N,N-Dimethyl-bicyclo[2,2,1]-heptene-2-carbonamide-5 | 3,582 | 1.48 |
| 4 | 5-Chlor-bicyclo[2,2,1]-heptene-2 | 2,717 | 1.30 |
| 5 | 3,6-Methylene-1,2,3,6-tetrahydro-cis-phthalic anhydride | 2,894 | 1.40 |
| 6 | N-Methyl-3,6-methylene-1,2,3,6-tetrahydro-cis-phthalimide | 3,189 | 1.25 |
| 7 | 5-Phenyl-bicyclo[2,2,1]-heptene-2 | 3,802 | 1.33 |
| 8 | 5-(2'-Pyridyl)-bicyclo[2,2,1]-heptene-2 | 2,541 | 1.41 |
| 9 | 1,4-Hydroxy-1,4-methanonaphthalene | 3,016 | 1.48 |
| 10 | 2-Methoxycarbonyl-bicyclo[2,2,1]-heptadiene-2,5 | 2,677 | 1.47 |
| 11 | Cyclopentene | 3,665 | 1.02 |

EXAMPLE 21

The same procedure as that of producing the reaction product in Example 1 was followed except that the reaction was carried out for 60 minutes at 150° C.

Then, 1.0 ml. of the supernatant liquid of the reaction product formed in the above step and the kinds and amounts of the third components for the catalyst as shown in Table 20 were placed in a one liter glass autoclave, the inside of which was completely replaced with nitrogen, and then they were vigorously stirred for 2 hours at the temperature as shown in Table 20. Then, 300 g. of 5-cyano-bicyclo[2,2,1]-heptene-2, 500 ml. of 1,2-dichloroethane and 6.0 ml. of a 1,2-dichloroethane solution of 1.0 mole/liter of diethylaluminum chloride were added and then the polymerization was carried out for 60 minutes at 80° C.

After the polymerization was over, the polymer was recovered in each case. The results are shown in Table 20.

Table 20

| No. | Third component Kind | Amount (g) | Reaction temp. (° C) | Polymerization activity (g/g-w.hr) |
|---|---|---|---|---|
| 1 | MgSO$_4$ | 2.0 | 75 | 3,181 |
| 2 | " | 5.0 | " | 2,964 |
| 3 | Na$_3$PO$_4$ | 2.0 | " | 2,732 |
| 4 | CePO$_4$ | " | " | 3,059 |
| 5 | TiOSO$_4$ | " | " | 2,583 |
| 6 | Cr(NO$_3$)$_3$ | " | " | 2,529 |
| 7 | Mn(H$_2$PO$_4$)$_2$ | 1.0 | 80 | 2,719 |
| 8 | (NH$_4$)$_2$Fe(SO$_4$)$_2$ | " | " | 2,977 |
| 9 | AgSO$_3$ | " | " | 2,962 |
| 10 | CuSCN | " | " | 3,087 |
| 11 | Hg(CN)$_2$ | " | " | 2,610 |
| 12 | Ba(NO$_2$)$_2$ | " | " | 2,515 |
| 13 | NaAl(SO$_4$)$_2$ | " | " | 2,529 |
| 14 | NiCO$_3$ | 2.0 | 60 | 2,624 |
| 15 | KHCO$_3$ | " | " | 2,950 |
| 16 | SnSO$_4$ | " | " | 3,004 |
| 17 | VOSO$_4$ . xH$_2$O | " | " | 2,787 |
| 18 | MgHPO$_4$ | " | " | 2,624 |
| 19 | K$_2$PHO$_3$ | " | " | 2,515 |
| 20 | AgCN | " | " | 2,529 |
| 21 | Na$_2$S$_2$O$_3$ | " | " | 2,730 |

EXAMPLE 22

The same polymerization procedure and post-treatment as in No. 1 of Example 21 was followed except that the monomers shown in Table 21 were used in place of the monomer used in Example 21. The results are shown in Table 21.

Table 21

| No. | Kind of monomer | Polymerization activity (g/g-w.hr) | Reduced viscosity (dimethyl formamide) |
|---|---|---|---|
| 1 | 5-Methoxycarbonyl-bicyclo[2,2,1]-heptene-2 | 3,263 | 1.45 |
| 2 | 5-Methoxy-bicyclo[2,2,1]-heptene-2 | 3,480 | 1.40 |
| 3 | N,N-Dimethyl-bicyclo[2,2,1]-heptene-2-carbonamide-5 | 3,140 | 1.36 |
| 4 | 5-Chlor-bicyclo[2,2,1]-heptene-2 | 2,800 | 1.42 |
| 5 | 3,6-Methylene-1,2,3,6-tetrahydro-cis-phthalic anhydride | 2,868 | 1.47 |
| 6 | N-Methyl-3,6-methylene-1,2,3,6-tetrahydro-cis-phthalimide | 3,100 | 1.29 |
| 7 | 5-Phenyl-bicyclo[2,2,1]-heptene-2 | 3,494 | 1.36 |
| 8 | 5-(2'-Pyridyl)-bicyclo[2,2,1]-heptene-2 | 2,991 | 1.40 |
| 9 | 1,4-Hydroxy-1,4-methanonaphthalene | 3,317 | 1.46 |
| 10 | 2-Methoxycarbonyl-bicyclo[2,2,1]-heptadiene-2,5 | 2,719 | 1.45 |
| 11 | Cyclopentene | 3,570 | 1.20 |

EXAMPLE 23

The same procedure as that of producing the reaction product in Example 1 was followed except that the reaction was carried out for 2.5 hours at 150° C.

Then, 1.0 ml. of the supernatant liquid of the reaction product formed in the above step and the kinds and amounts of the polymers containing an active group as shown Table 22 were placed in a one liter glass autoclave, the inside of which was completely replaced with nitrogen, and then they were vigorously stirred for 5 hours at the temperature as shown in Table 22. Then, 300 g. of 5-cyano-bicyclo[2,2,1]-heptene-2, 500 ml. of 1,2-dichloroethane and 6.0 ml. of a 1,2-dichloroethane solution of 1.0 mole/liter of diethylaluminum chloride were added and then the polymerization was carried out for 60 minutes at 85° C.

After the polymerization was over, the polymer was recovered in each case. The results are shown in Table 22.

Table 22

| No. | Third component Kind | Amount (g) | Reaction temp. (° C) | Polymerization activity (g/g-w.hr) |
|---|---|---|---|---|
| 1 | Polyvinyl alcohol (polymerization degree about 1,700) | 1.0 | 70 | 3,436 |
| 2 | " | 5.0 | " | 3,265 |
| 3 | Cellulose | | " | 3,012 |
| 4 | Polyvinyl acetate (polymerization degree about 1,800) | | " | 3,271 |
| 5 | Nylon-6 (molecular weight about 10,000) | | 85 | 3,160 |
| 6 | Polyacrylic amide (polymerization degree about 1,500) | | " | 3,367 |
| 7 | Poly(V-vinyl pyrrolidone) molecular weight about 50,000) | | 60 | 3,254 |
| 8 | Phenol-aldehyde resin (molecular weight about 800) | | " | 3,113 |
| 9 | Poly(N-vinyl pyridine) (molecular weight about 1,000) | | 70 | 3,225 |
| 10 | Polyurea (polymerization degree about 500) | | " | 3,351 |
| 11 | Polyacrylic acid (polymerization degree about 1,000) | | 70 | 3,194 |
| 12 | Polyester*1 | | " | 3,280 |
| 13 | Polysulfide*2 | | " | 3,175 |
| 14 | Polyisocyanate (molecular weight about 30,000) | 80 | | 3,169 |

*1The trade name "Viron-200" manufactured by Toyo Boseki K.K.
*2The trade name "Hitacol" manufactured by Hitachi Kasei K.K.

EXAMPLE 24

The same polymerization procedure and post-treatment as in No. 1 of Example 23 was followed except that the monomers shown in Table 23 were used in place of the monomer used in Example 23. The results are shown in Table 23.

Table 23

| No. | Kind of monomer | Polymerization activity (g/g-w.hr) | Reduced viscosity (dimethyl formamide) |
|---|---|---|---|
| 1 | 5-Methoxycarbonyl-bicyclo[2,2,1]-heptene-2 | 3,558 | 1.21 |
| 2 | 5-Methoxy-bicyclo[2,2,1]-heptene-2 | 3,300 | 1.18 |
| 3 | N,N-Dimethyl-bicyclo[2,2,1]-heptene-2-carbonamide-5 | 3,056 | 1.31 |
| 4 | 5-Chlor-bicyclo[2,2,1]-heptene-2 | 3,368 | 1.19 |
| 5 | 3,6-Methylene-1,2,3,6-tetrahydro-cis-phthalic anhydride | 3,395 | 1.20 |
| 6 | N-Methyl-3,6-methylene-1,2,3,6-tetrahydro-cis-phthalimide | 3,409 | 1.17 |
| 7 | 5-Phenyl-bicyclo[2,2,1]-heptene-2 | 3,639 | 1.25 |
| 8 | 5-(2'-Pyridyl)-bicyclo[2,2,1]-heptene-2 | 3,232 | 1.09 |
| 9 | 1,4-Hydroxy-1,4-methanonaphthalene | 3,436 | 1.25 |
| 10 | 2-Methoxycarbonyl-bicyclo[2,2,1]-heptadiene-2,5 | 3,085 | 1.33 |
| 11 | Cyclopentene | 3,687 | 1.21 |

We claim:

1. In the process for producing a ringopening polymerization product comprising polymerizing a monomer selected from the group consisting of a norbornene derivative containing at least one polar group or aromatic group, a norbornadiene derivative containing at least one of said groups and a cycloolefin, the improvement comprising polymerizing said monomer in the presence of a catalyst system prepared from
    (A) an organometallic compound containing at least one metal selected from the group consisting of metals of Groups IA, IIA, IIB, IIIB, IVA and IVB of the periodic table and
    (B) the reaction product of at least one oxide selected from the group consisting of tungsten oxide and molybdenum oxide and from 0.001 to 100 moles per mole of said oxide of at least one phosphorus compound selected from the group consisting of phosphorus pentahalide and phosphorus oxytrihalide; the molar ratio of the component (A) to the component (B) being 0.1 to 100, and said catalyst system being present in the ring-opening polymerization system in an amount of 0.001 - 100 gram atom calculated as tungsten or molybdenum contained in said catalyst system per 1,000 moles of said monomer.

2. The process of claim 1 wherein said monomer is a norbornene derivative containing at least one nitrile group.

3. The process of claim 2 wherein said norbornene derivative is represented by the formula (I)

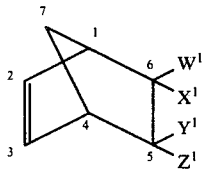

(I)

wherein $W^1$, $X^1$, $Y^1$, and $Z^1$, which may be the same or different, each represents a hydrogen atom, a nitrile group or a hydrocarbon group selected from the group consisting of an alkyl group having at most 20 carbon atoms, a cycloalkyl group having at most 20 carbon atoms, an alkenyl group having at most 20 carbon atoms, an aryl group having at most 20 carbon atoms and said hydrocarbon groups substituted by a nitrile group, at least one of $W^1$, $X^1$, $Y^1$, and $Z^1$ being a nitrile group or said hydrocarbon group substituted with a nitrile group.

4. The process of claim 3, wherein said norborene derivative is 5-cyano-bicyclo[2,2,1]-heptene-2; 5,5-dicyano-bicyclo [2,2,1]-heptene-2; 5,6-dicyano-bicyclo [2,2,1]-heptene-2; 5-cyano-5-methyl-bicyclo[2,2,1]-heptene-2; 5-cyano-6-methyl-bicyclo[2,2,1]-heptene-2; or 5-cyanomethyl-bicyclo[2,2,1]-heptene-2.

5. The process of claim 1, wherein said monomer is a norbornene derivative containing at least one ester group.

6. The process of claim 5, wherein said norbornene derivative is 5-methoxycarbonyl-bicyclo [2,2,1]-heptene-2; 5-ethoxycarbonyl-bicyclo [2,2,1]-heptene-2; 5-butoxycarbonyl-bicyclo[2,2,1]-heptene-2; 5-allyloxycarbonyl-bicyclo[2,2,1]-heptene-2; 5-methyl-5-methoxycarbonyl-bicyclo[2,2,1]-heptene-2; 5-methoxycarbonyl-6-methoxycarbonyl-methyl-bicyclo[2,2,1]-heptene-2; 5,6-dimethyoxycarbonyl-bicyclo[2,2,1]-heptene-2; 5,6-diethoxycarbonyl-bicyclo[2,2,1]-heptene-2; 5,5-dibutoxycarbonyl-bicyclo[2,2,1]-heptene-2; 5-acetoxymethyl-bicyclo[2,2,1]-heptene-2; 5-propoxymethyl-bicyclo [2,2,1]-heptene-2 or 5-stearoxymethyl-bicyclo[2,2,1]-heptene-2.

7. The process of claim 1, wherein said monomer is a norbornene derivative containing at least one ether group.

8. The process of claim 7, wherein said norbornene derivative is 5-methoxymethyl-bicyclo[2,2,1]-heptene-2.

9. The process of claim 1, wherein said monomer is a norbornene derivative containing at least one halogen atom.

10. The process of claim 9, wherein said norbornene derivative is 5-chloro-bicyclo[2,2,1]-heptene-2; 5-chloro-5-methyl-bicyclo[2,2,1]-heptene-2; 5- chloro-6-methyl-bicyclo[2,2,1]-heptene-2; 5-chloromethyl-bicyclo[2,2,1]-heptene-2; 5,5-dichlorobicyclo[2,2,1]-heptene-2; 5,6-dichloro-bicyclo[2,2,1]-heptene-2; 5,5-bis(-chloromethyl)-bicyclo[2,2,1]-heptene-2; or 5,6-bis(-chloromethyl)-bicyclo[2,2,1]-heptene-2.

11. The process of claim 1, wherein said monomer is a norbornene derivative containing at least one acid anhydride group.

12. The process of claim 11, wherein said norbornene derivative is 3,6-methylene-1,2,3,6-tetrahydro-cis-phthalic anhydride; 5,8-methano-1,2,3,4,4a,5,8,8a-octahydronaphthalene-2,3,-dicarboxylic anhydride; 1,4,5,8-dimethano-1,2,3,4,4a,5,8,8a-octahydronaphthalene-2,3-dicarboxylic anhydride; or 3,6-methano-1-methyl-1,2,3,6-tetrahydro-cis-phthalic acid anhydride.

13. The process of claim 1, wherein said monomer is a norbornene derivative containing at least one imide group.

14. The process of claim 13, wherein said norbornene derivative is N-methyl-3,6-methylene-1,2,3,6-tetrahydro-cis-phthalimide; N-ethyl-3,6-methylene-1,2,3,6-tetrahydro-cis-phthalimide; N-propyl-3,6-methylene-1,2,3,6-tetrahydro-cis-phthalimide; N-n-butyl-3,6-methylene-1,2,3,6-tetrahydro-cis-phthalimide; N-octyl-3,6-methylene-1,2,3,6-tetrahydro-cis-phthalimide, N-cyclohexyl-3,6-methylene-1,2,3,6-tetrahydro-cis-phthalimide; N-phenyl-3,6-methylene-1,2,3,6-tetrahydro-cis-phthalimide or N-octyl-1,4,5,8-dimethano-1,2,3,4,4a,5,8,8a-octahydronaphthalene-2,3-dicarboxyimide.

15. The process of claim 1, wherein said monomer is 1,4-dihydro-1,4-methanonaphthalene.

16. The process of claim 1, wherein said monomer is cyclopentene, 1,5-cyclooctadiene or bicyclo[2,2,1]-heptene-2.

17. The process of claim 1, wherein said organometallic compound is represented by the formula $$MR_n$$

wherein M represents the metal belonging to group IA, IIA, IIB, IIIB, IVA, or IVB of the periodic table; R represents an organic group having at most 20 carbon atoms selected from an alkyl group, an alkenyl group, an aryl group, an aralkyl group, an alkoxide group, a phenoxy group, and a cyclopentadienyl group, a hydrogen atom, or a halogen atom, the groups represented by $R_n$ may be the same or different and at least one of said groups is the organic group; n represents the maximum atomic valence number of said metal or a positive integer of less than the maximum atomic valence number.

18. The process of claim 17, wherein M represents aluminum.

19. The process of claim 18, wherein said organometallic compound is triethylaluminum or diethylaluminum chloride.

20. The process of claim 1, wherein said organometallic compound is aluminum siloxane represented by the formula

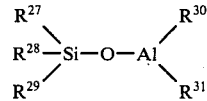

wherein $R^{27}$, $R^{28}$ and $R^{29}$, which may be the same or different, each represents a halogen atom, an alkyl group having at most 10 carbon atoms, or an alkoxy groups having at most 10 carbon atoms; $R^{30}$ represents an alkyl group having at most 10 carbon atoms; and $R^{31}$ represents an alkyl group having at most 10 carbon atoms, an alkoxy group having at most 10 carbon atoms, or a substituent having the formula

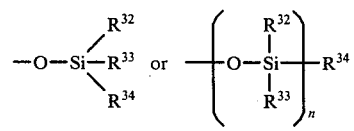

where $R^{32}$, $R^{33}$ and $R^{34}$, which may be the same or different, each has the same meaning as $R^{27}$, $R^{28}$ and $R^{29}$ above and $n$ is a positive integer less than 10.

21. The process of claim 20, wherein said aluminum siloxalane is diethyl aluminum triethylsiloxalane.

22. The process of claim 1, wherein said organometallic compound is a dialumoxane compound represented by the formula

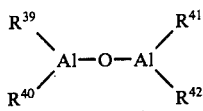

wherein $R^{39}$, $R^{40}$ and $R^{41}$, which may be the same or different, each represents a halogen atom, an alkyl group having at most 10 carbon atoms, or an alkoxy group having at most 10 carbon atoms and $R^{42}$ represents an alkyl group having at most 10 carbon atoms.

23. The process of claim 22, wherein said dialumoxane compound is tetraethyl dialumoxane.

24. The process of claim 1, wherein said oxide is tungsten trioxide or molybdenum trioxide.

25. The process of claim 1, wherein said phosphorus compound is phosphorus pentachloride, phosphorus pentabromide, phosphorus pentafluoride, or phosphorus oxytrichloride.

26. The process of claim 1, wherein said reaction product is prepared at a temperature of 0° to 250° C in an inert organic solvent.

27. The process of claim 1, wherein said ring-opening polymerization is carried out in the presence of an unsaturated polymer having carbon-carbon double bonds.

28. The process of claim 1, wherein said ring-opening polymerization is carried out in the presence of a molecular weight controlling agent.

29. The process of claim 1, wherein said catalyst system is prepared from the organometallic compound, the reaction product, and further a third component selected from the group consisting of water, oxygen, an oxygen-containing organic compound, a nitrogen-containing organic compound, a halogen-containing organic compound, a phosphorus-containing compound, a sulfur-containing compound, a metal-containing organic compound, a metal hydroxide, a metal oxide, a metal halide, a metal chelate compound, a metal salt and a reactive group-containing polymer.

30. The process of claim 29, wherein said phosphorus-containing compound is a phosphate compound.

31. The process of claim 30, wherein said phosphate compound is a halogen-containing phosphate compound represented by the formula

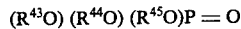

wherein $R^{43}$, $R^{44}$ and $R^{45}$, which may be the same or different, each represents a hydrocarbon group having at most 20 carbon atoms or halogen-substituted hydrocarbon groups having at most 20 carbon atoms, at least one of said $R^{43}$, $R^{44}$ and $R^{45}$ being a hydrocarbon group substituted with at least one halogen atom.

32. The process of claim 31, wherein said a halogen-containing phosphate compound is selected from the group consisting of tris($\beta$-Chloro-ethyl) phosphate, tris($\beta$-bromo-ethyl) phosphate, tris(2,3-dichloro-n-propyl) phosphate, tris(2,3-dibromo-n-propyl) phosphate, tris(2-bromo-3-chloro-n-propyl) phosphate, tris(3-chloro-n-propyl) phosphate, tris(dichloroisopropyl) phosphate and tris(2,4-dichloro-phenyl) phosphate.

33. The process of claim 5 wherein said norbornene derivative is one of the compounds represented by general formulae (II), (III), (IV) and (V):

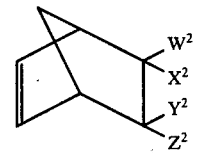

(II)

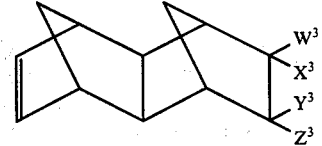

(III)

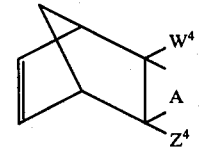

(IV)

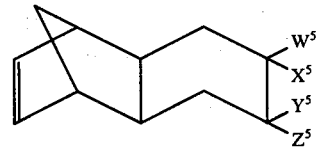

(V)

wherein $W^2$, $X^2$, $Y^2$ and $Z^2$ in general formula (II) and $W^3$, $X^3$, $Y^3$ and $Z^3$ in general formula (III) and $W^5$, $X^5$, $Y^5$ and $Z^5$ in general formula (V), which may be the same or different, each represents a hydrogen atom, an ester group represented by the general formulae —COOR$^1$ or —OCOR$^1$ wherein $R^1$ represents a hydrocarbon group having at most 20 carbon atoms, an ester group-substituted hydrocarbon residue represented by the general formulae —R$^2$COOR$^3$ or —R$^2$OCOR$^3$ wherein $R^3$ has the same meaning as $R^1$ and $R^2$ represents a divalent hydrocarbon group having at most 20 carbon atoms, or a hydrocarbon group having at most 20 carbon atoms, at least one of said $W^2$, $X^2$, $Y^2$ and $Z^2$ and $W^3$, $X^3$, $Y^3$ and $Z^3$ and $W^5$, $X^5$, $Y^5$ and $Z^5$ being said ester group or said ester group-substituted hydrocarbon residue; wherein A represents —COO—R$^4$-OOC— or —COOR$^5$ wherein $R^4$ and $R^5$ each represents an alkylene group having at most 20 carbon atoms; and wherein $W^4$ and $Z^4$ in formula (IV), which may be the same or different, each represents a hydrogen atom or a hydrocarbon group having at most 20 carbon atoms.

34. The process of claim 7 wherein said norbornene derivative is one of the compounds represented by the general formulae (VI), (VII) and (VIII):

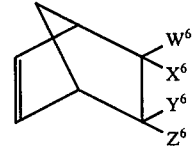

(VI)

-continued

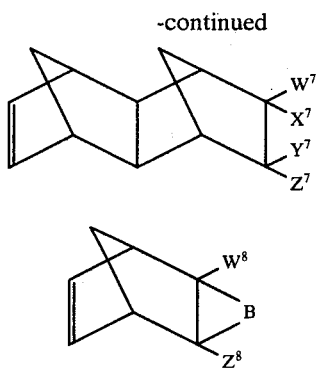

(VII)

(VIII)

wherein $W^6$, $X^6$, $Y^6$ and $Z^6$ in general formula (VI) and $W^7$, $X^7$, $Y^7$ and $Z^7$ in general formula (VII), which may be the same or different, each represents a hydrogen atom, an ether group, a hydrocarbon group having at most 20 carbon atoms or an ether group-substituted hydrocarbon residue of the formula —$R^7OR^6$ wherein $R^6$ represents a hydrocarbon group having at most 20 carbon atoms and $R^7$ represents a divalent hydrocarbon group having at most 20 carbon atoms, at least one of said $W^6$, $X^6$, $Y^6$ and $Z^6$ and $W^7$, $X^7$, $Y^7$ and $Z^7$ being said ether group or said ether group-substituted hydrocarbon residue; wherein B represents —$R^8OR^9$ or —$R^1$-$_0O$— wherein $R^8$, $R^9$ and $R^{10}$, which may be the same or different, each represents a hydrocarbon group having at most 20 carbon atoms; and wherein $W^8$ and $Z^8$ in general formula (VIII), which may be the same or different, each represents a hydrogen atom or a hydrocarbon group having at most 20 carbon atoms.

35. The process of claim 9 wherein said norbornene derivative is one of the compounds represented by general formulae (XI) and (XII):

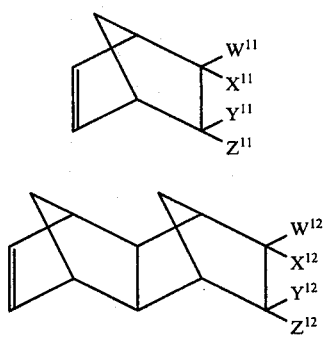

(XI)

(XII)

wherein $W^{11}$, $X^{11}$, $Y^{11}$ and $Z^{11}$ in general formula (XI) and $W^{12}$, $X^{12}$, $Y^{12}$ and $Z^{12}$ in general formula (XII), which may be the same or different, each represents a hydrogen atom, a chlorine atom, a bromine atom, a hydrocarbon group having at most 20 carbon atoms or a hydrocarbon residue having at most 20 carbon atoms and substituted by at least one chlorine or bromine atom, at least one of said $W^{11}$, $X^{11}$, $Y^{11}$ and $Z^{11}$ and $W^{12}$, $X^{12}$, $Y^{12}$ and $Z^{12}$ being a chlorine or bromine atom or said hydrocarbon residue.

36. The process of claim 11 wherein said norbornene derivative is one of the compounds represented by the general formulae (XIII) or (XIV):

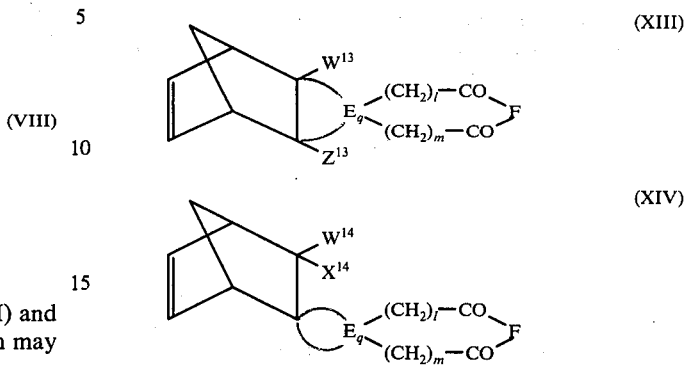

(XIII)

(XIV)

wherein $W^{13}$ and $Z^{13}$ in general formula (XIII) and $W^{14}$ and $X^{14}$ in general formula (XIV), which may be the same or different, each represents a hydrogen atom or a hydrocarbon group having at most 20 carbon atoms; wherein E represents a tetravalent hydrocarbon group having from 4 to 20 carbon atoms; wherein F represents an oxygen atom; wherein $l$ and $m$ each independently represents 1 or 2; and wherein $q$ represents 0 or 1, wherein when $q$ is 0, the carbon atoms of the norbornene ring form a ring together with the acid anhydride-containing group.

37. The process of claim 13 wherein said norbornene derivative is one of the compounds represented by the general formulae (XV) and (XVI):

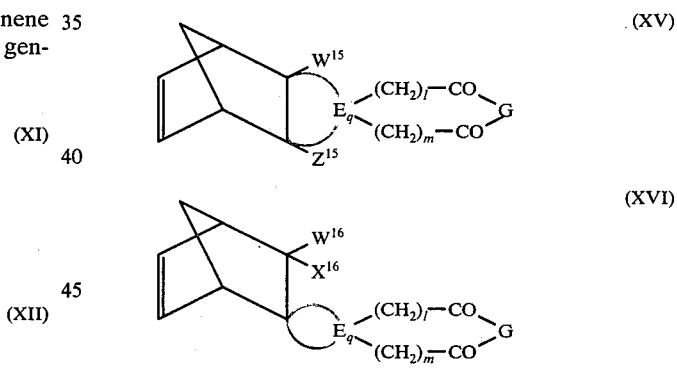

(XV)

(XVI)

wherein $W^{15}$ and $Z^{15}$ in general formula (XV) and $W^{16}$ and $X^{16}$ in general formula (XVI), which may be the same or different, each represents a hydrogen atom or a hydrocarbon group having at most 20 carbon atoms; wherein E represents a tetravalent hydrocarbon group having from 4 to 20 carbon atoms; wherein G represents a group of the formula $>N-R^{21}$ wherein $R^{21}$ represents a hydrocarbon group having at most 20 carbon atoms or a hydrocarbon residue having an ester group; wherein $l$ and $m$ each independently represents 1 to 2; and wherein $q$ represents 0 or 1, wherein when $q$ is 0, the carbon atoms of the norbornene ring form a ring together with the imide group-containing group.

* * * * *

UNITED STATES PATENT OFFICE
CERTIFICATE OF CORRECTION

Patent No. 4,080,491   Dated March 21, 1978

Inventor(s) YUKIO KOBAYASHI, ET AL

It is certified that error appears in the above-identified patent and that said Letters Patent are hereby corrected as shown below:

Column 1, line 50, change "pipers" to --pipes--;
Column 5, line 29, change "of" to --or--;
Column 8, line 30, change "wherin" to --wherein--;
    line 49, change "--5-chloro" to "5-chloro";
Column 14, line 40, change "4methananthracene" to "4-methanoanthracene";
Column 15, line 39, change "4a,5,-8,8a-" to "4a,5,8,8a";
    line 44, delete "substituents"; change "$W^1$, $X^1$, $Y^1$ and $Z^1$" to -- W, X, Y and Z --; and after "Z" and before "in the above" insert -- substituents --;
Column 18, line 66, change "$R^{30}$" to -- $R^{33}$ --;
Column 19, line 20, change "$R^5$, $R^6$ and $R^7$" to -- $R^{35}$, $R^{36}$ and $R^{37}$ --;
    line 24, change "a" to -- at --;
    line 33, change "$R^8$" to -- $R^{38}$ --;
    line 41, change "$R^9$" to -- $R^{39}$ --;
    line 66, change "dicyclopentadienytitanium" to -- dicyclopentadienyltitanium --;
Column 23, line 32, change "4-methylquionline" to -- 4-methylquinoline --;
Column 24, line 24, change "$R^{43}O$)" to -- ($R^{43}O$) --;
Column 25, line 18, change "$WO_2,WO_3$)" to --($WO_2,WO_3$)--;
    line 32, change "crystalization" to -- crystallization --;
    line 38, change "carbonate" to -- carbonates --;
    line 45, after "manganese" delete the comma;
    line 49, change the dot at the end of the line to "-";
    line 51, change the numeral "0" in "0H" to the letter "O";
    line 59, after "KCl" insert -- CuCl --;
    line 61, after "$VCl_3$" insert -- $VCl_4$ --;

UNITED STATES PATENT OFFICE
CERTIFICATE OF CORRECTION

Patent No. 4,080,491           Dated   March 21, 1978

Inventor(s) YUKIO KOBAYASHI, ET AL

It is certified that error appears in the above-identified patent and that said Letters Patent are hereby corrected as shown below:

Column 1, line 54, change "riesin" to -- resin --;
Columne 3, line 48, change "referring at" to --referred to as--;
Column 6, line 57, change "heptene-]" to "heptene-2"
Column 8, line 52, change "[2,2.k]" to --[2,2,1]--;
        line 58, change "chl-or" to --chloro--;
Column 9, line 5, change "Nos." to --No.--;
Column 10, line 46, change "1,2,3,6-te-rahydro-cis-p-thalimide" to -- 1,2,3,6-tetrahydro-cis-phthalimide --;
        line 64, change "[2,2,12-heptene" to "[2,2,1]-heptene";
Column 11, line 27, delete "indicated above";
Column 12, line 44, change "Nos." to --No.--;
        line 64, change "Nos." to --No.--;
Column 13, line 51, change "2caprolyloxy" to "2-caproyloxy";
        line 52, change "2-capryloxy" to "2-caproyloxy";
Column 16, line 66, change "then" to --than--;
Column 24, line 16, change "sush" to --such--;
Column 25, line 50, change "[(Mg" to "[Mg";
Column 26, line 61, change "sodium phosdihydron phosphate" to -- sodium phosphate, cerium phosphate, magnesium hydrogen phosphate, manganese dihydrogen phosphate --.
Column 27, line 47, after "the" delete "number of"; after "the" (second occurrence), insert --number of--;

UNITED STATES PATENT OFFICE
CERTIFICATE OF CORRECTION

Patent No. 4,080,491   Dated March 21, 1978

Inventor(s) YUKIO KOBAYASHI, ET AL

It is certified that error appears in the above-identified patent and that said Letters Patent are hereby corrected as shown below:

Column 25, line 66, change "VoCl$_3$" to -- VOCl$_3$ --;
Column 26, line 9, change "III" to -- IIIB --;
    line 30, delete "the";
    line 36, change "isoproside" to -- isoproxide --;
    line 63, change "nitrate" (second occurrence) to -- nitrite --;
Column 27, line 12, change "sulfurbearing" to "sulfur-bearing";
    line 25, change "700" to -- 7000 --;
    line 44, change "preferably" to -- preferable --;
Column 28, line 34, after "If" delete "the";
    line 55, change "3-methyl-1-butyne 1-hexane" to "3-methyl-1-butyne, 1-hexyne";
    line 62, change "-octatetriene" to "-octatetraene";
Column 29, lines 18 and 19, delete the comma after "chloroprene" and before "rubbers";
    line 32, change "This" to -- The --;
Column 32, line 57, change "gas" to -- was --;
Column 33, line 5, change "100 ml." to -- 100 mg. --;
    line 45, insert the footnote superscript "$^{4)}$" at the end of the empirical formula in No. 5 in Table 1;
Column 37, line 25, insert the footnote superscript "$^{4)}$" at the end of the empirical formula in No. 5 in Table 7;
    line 47, in Table 8, opposite "No. 2", change "1.09$^{2)}$" to -- 1.09$^{a)}$ --;
    line 51, in Table 8, opposite "No. 8", change "(G)$^{10)}$" to -- (H)$^{10)}$ --;
    line 53, in footnote "1)", change "5-cyan.-" to "5-cyano-";
Column 41, line 27, change "as" to -- are --;
    , end of line 51, insert -- The results are shown in Table 15. --;
Column 42, line 26, "as" to -- are --;

UNITED STATES PATENT OFFICE
CERTIFICATE OF CORRECTION

Patent No. 4,080,491            Dated March 21, 1978

Inventor(s) YUKIO KOBAYASHI, ET AL

It is certified that error appears in the above-identified patent and that said Letters Patent are hereby corrected as shown below:

Column 42, about line 35 in Table 16, instead of " "3,261 " in the next-to-last vertical column, it should read the ditto mark in that column, and the last column should read "3,261";

Column 42, about line 52, move "1,725" to the last vertical column of Table 16;

Column 44, about line 2, in the table heading, change "Polymer-" to -- Polymerization --;

Column 45, Table 22, in Nos. 7-14, move the items listed under the "Amount" column to the "Reaction temp." column and the items listed under the "Reaction temp." column to the "Polymerization activity" column;

Column 47, claim 4, line 1, change "norborene" to --norbornene--;
        claim 20, line 4, after the first formula, change "groups" to -- group --;

Column 51, claim 34, from the end of line 12 to the beginning of line 13, after the formulae, change
" $\begin{matrix}-R^1-\\ oO-\end{matrix}$ " to " $\begin{matrix}-R^{10}-\\ O-\end{matrix}$ ";

Column 52, claim 37, line 10 after the formulae, change "to" to -- or --.

UNITED STATES PATENT OFFICE
CERTIFICATE OF CORRECTION

Patent No. 4,080,491           Dated   March 21, 1978

Inventor(s) YUKIO KOBAYASHI, ET AL

It is certified that error appears in the above-identified patent and that said Letters Patent are hereby corrected as shown below:

```
Column 31, line 53, delete "the" (second occurrence);
Column 38, line 5, change "The, to the" to --Then, to the--;
Column 49, claim 32, line 1, delete "a".
```

Signed and Sealed this

Tenth Day of October 1978

[SEAL]

Attest:

RUTH C. MASON
*Attesting Officer*

DONALD W. BANNER
*Commissioner of Patents and Trademarks*